(12) United States Patent
Yang et al.

(10) Patent No.: US 6,838,142 B2
(45) Date of Patent: Jan. 4, 2005

(54) SPECULAR LAMINATES

(75) Inventors: Jie Yang, Woodbury, MN (US); Mieczyslaw H. Mazurek, St. Paul, MN (US); Patrick R. Fleming, Lake Elmo, MN (US); Larry A. Meixner, Woodbury, MN (US); Haruyuki Mikami, Odawara (JP)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

(21) Appl. No.: 09/861,015

(22) Filed: May 18, 2001

(65) Prior Publication Data

US 2003/0082326 A1 May 1, 2003

(51) Int. Cl.$^7$ .................................................. B32B 3/00
(52) U.S. Cl. ................... 428/40.1; 428/41.7; 428/41.8; 428/42.1; 428/156; 428/914
(58) Field of Search .............................. 428/40.1, 41.7, 428/41.8, 42.1, 156, 914

(56) References Cited

U.S. PATENT DOCUMENTS

| | | |
|---|---|---|
| RE24,906 E | 12/1960 | Ulrich |
| 3,239,478 A | 3/1966 | Harlan, Jr. |
| 3,935,338 A | 1/1976 | Robertson |
| 4,181,752 A | 1/1980 | Martens et al. |
| 4,952,650 A | 8/1990 | Young et al. |
| 5,138,488 A | 8/1992 | Szczech |
| 5,141,790 A | 8/1992 | Calhoun et al. |
| 5,169,727 A | 12/1992 | Boardman |
| 5,260,215 A | 11/1993 | Clapp et al. |
| 5,296,277 A | 3/1994 | Wilson et al. |
| 5,344,681 A | 9/1994 | Calhoun et al. ............... 428/42 |
| 5,362,516 A | 11/1994 | Wilson et al. |
| 5,650,215 A | 7/1997 | Mazurek et al. |
| 5,858,510 A | 1/1999 | Dressler ..................... 428/167 |
| 5,897,930 A | 4/1999 | Calhoun et al. |
| 6,013,722 A | 1/2000 | Yang et al. |
| 6,197,397 B1 | 3/2001 | Sher et al. |

FOREIGN PATENT DOCUMENTS

| | | |
|---|---|---|
| EP | 0 372 756 A2 | 6/1990 |
| EP | 0 926 214 A2 | 6/1999 |
| JP | 3-243677 | 10/1991 |
| WO | WO 98/29516 | 7/1998 |
| WO | WO 00/69985 | 11/2000 |

OTHER PUBLICATIONS

Smith, "Characteristics of the Eye," *Modern Optical Engineering—The Design of Optical Systems*, 1966, McGraw Hill Book Company, New York, pp. 104–105.

*Primary Examiner*—Nasser Ahmad
(74) *Attorney, Agent, or Firm*—Nancy M. Lambert

(57) ABSTRACT

A pressure sensitive adhesive layer with a structured surface, wherein the adhesive layer is capable of being dry laminated to a substrate to form a laminate. The adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

18 Claims, 11 Drawing Sheets

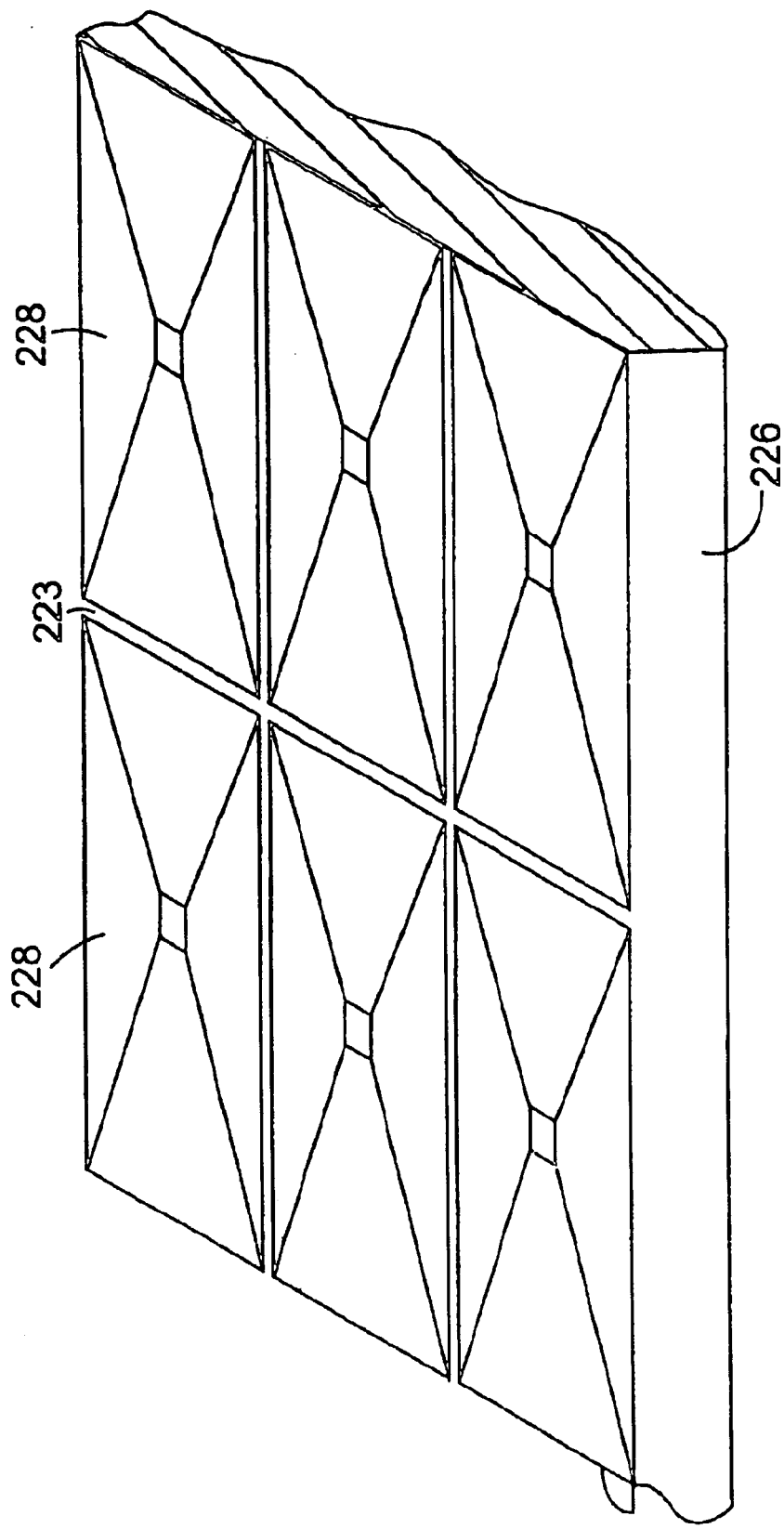

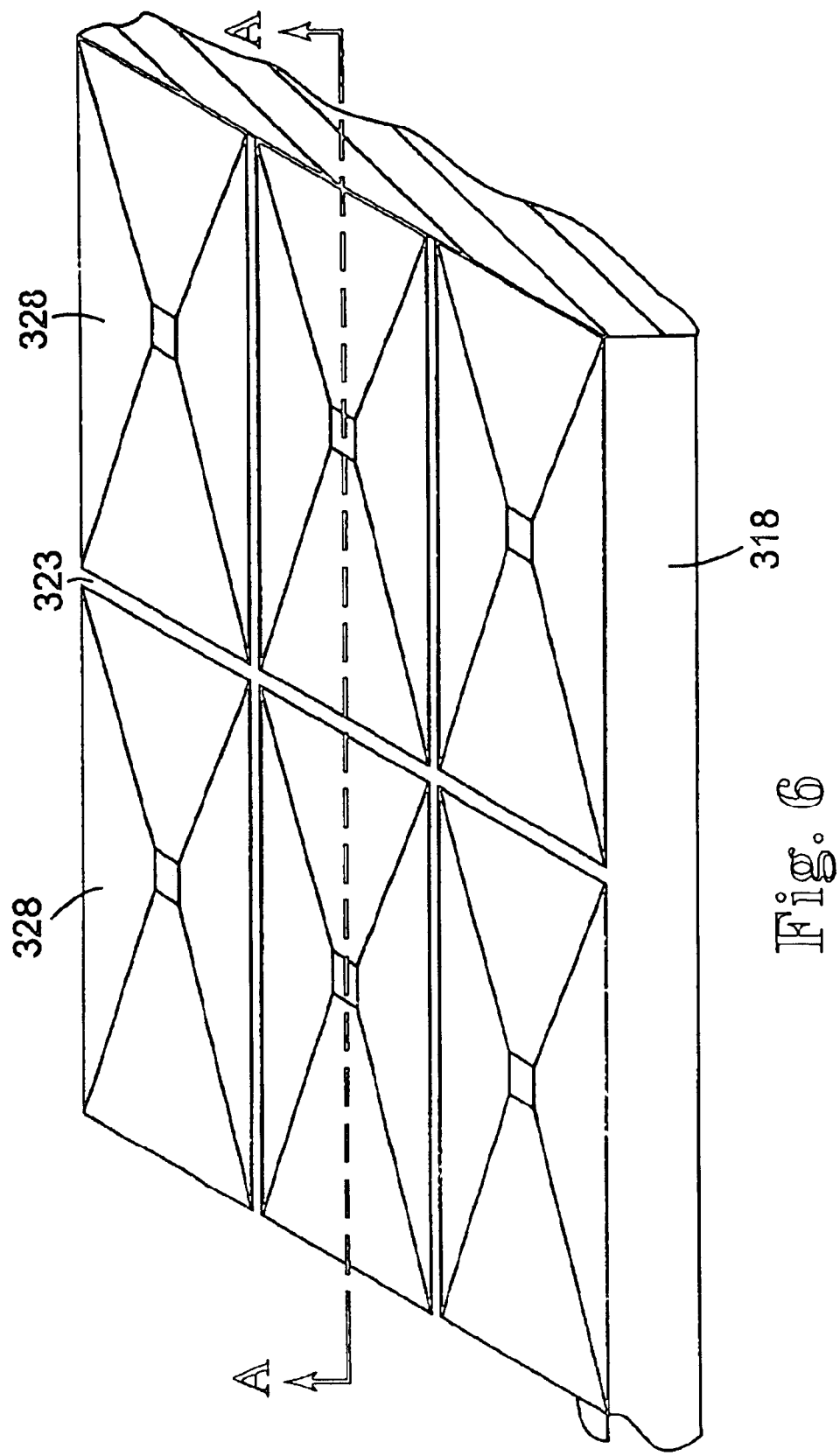

SPECULAR LAMINATES

TECHNICAL FIELD

This invention relates to specular laminates made with structured adhesives.

BACKGROUND

In many applications it is necessary to provide an observer with a substantially undistorted view through a multi-layered laminate structure. In one common application, two substantially transparent rigid substrates, such as sheets of glass or a transparent polymeric material, must be bonded together with an adhesive layer between them. Or, one of the substrates may be relatively rigid and the other flexible. For example, an imaged polymeric film may be adhered to a glass panel as a decorative decal. A polymeric film may be adhered to a screen of a display device to take advantage of the polarizing, or reflective properties of the film to increase the brightness, color, or contrast of the display.

To apply a polymeric film to a screen of a display device, a window, or a vehicular windshield, heat and/or photo curable adhesives are not practical. In these applications pressure sensitive adhesives are traditionally used to bond the substrates and form the laminate. Pressure sensitive adhesives do not require a separate curing step like heat or photo curable adhesives, and may be more easily removed and/or repositioned on the substrate.

However, when the substrate and the pressure sensitive adhesive layer are adhered, it is difficult to ensure a firm and reliable bond in the laminate structure. In addition, air is typically trapped at the interfaces between the adhesive and the substrate, and the resulting bubbles cause haze and compromise the optical properties of the laminate. It is inconvenient and messy to wet a substrate with water or a plasticizer to control adhesion and allow trapped air to dissolve into the adhesive layer at the interface with the substrate.

The pressure sensitive adhesive backed articles described in U.S. Pat. No. 5,897,930, U.S. Pat. No. 6,197,397, WO 00/69985, and U.S. Ser. Nos. 09/311,101, 09/638,346 and 09/639,244 include an adhesive layer with a plurality of interconnecting microchannels. A typical article 10 of this type is shown in FIG. 1, and includes a film 12 having opposed surfaces 14 and 16. The surface 14 of the film 12 is imaged to form a graphic 13. A layer of a pressure sensitive adhesive 18 is bonded to the surface 16 of the film 12. The pressure sensitive adhesive 18 includes a surface 20 that can be bonded to a substrate. A release liner 26 is releasably attached to the pressure sensitive adhesive 18. The release liner 26 includes protrusions 28 and land areas 29 that form corresponding channels 24 and land areas 22 in the pressure sensitive adhesive layer 18. The release liner 26, shown in a partially removed state, is fully detachable when pulled in the direction of arrow A and is used to protect the pressure sensitive adhesive prior to application of the article 10 on a substrate.

The geometry and spacing of the protrusions 28 and land areas 29 on the release liner 26, and the corresponding channels 24 and land areas 22 in the pressure sensitive adhesive layer 18, may be selected, along with the surface characteristics of the substrate and the rheology of the adhesive itself, to provide specific temporary and/or permanent properties for the article 10. In general, the geometry and spacing of the structures in the release liner and adhesive layer should be sized according to the following general design considerations. First, the protrusions should preferably be sufficiently large to allow egress of fluids to the periphery of the adhesive layer for exhaustion into the surrounding atmosphere, but not so large as to allow ingress of unwanted fluids beneath the adhesive layer. Second, the structures should also not be so large as to detract from the appearance of an exposed surface of a film adhered to the adhesive layer, particularly if the film is to be imaged. Third, the structures should not be so large as to detract from the adhesive bonding performance of the adhesive layer.

SUMMARY

In a first aspect, the invention is a pressure sensitive adhesive layer with at least one structured surface. The adhesive layer is capable of being dry laminated to a substrate to form a laminate. The adhesive layer has a haze after lamination, measured according to ASTM D 1003-95, of less than about 50% of the haze of the adhesive layer before lamination. The adhesive layer after dry lamination has a luminous transmittance of more than about 85%, a haze of less than about 25%, and an opacity of less than about 3%.

In a second aspect, the invention is a laminate including a first substantially specular substrate, a second substantially specular substrate, and a structured pressure sensitive adhesive layer between the first and second substrate. The adhesive layer has a luminous transmittance of more than about 85%, haze of less than about 25% and an opacity of less than about 3%.

In a third aspect, the invention is a transfer tape including a carrier layer with a pressure sensitive adhesive thereon. The adhesive layer is capable of being dry laminated to a substrate to form a laminate, and the said adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

In a fourth aspect, the invention is a tape including a substrate with a first surface and a second surface, wherein at least one of the first and second surfaces of the substrate have applied thereon a pressure sensitive adhesive. The tape is capable of being dry laminated to a substrate to form a laminate, said adhesive layer having a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

In a fifth aspect, the invention is a decal including an imaged polymeric film with a layer of a structured pressure sensitive adhesive thereon. The decal is capable of being laminated to a substantially specular substrate to form a laminate, and the adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

In a sixth aspect, the invention is a method for making a substantially specular laminate, including providing a substantially continuous layer of a structured pressure sensitive adhesive, and dry laminating the adhesive layer to a substantially specular substrate to form a laminate. The adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

In a seventh aspect, the invention is a method for making a substantially specular laminate, including providing a substantially continuous layer of a structured pressure sensitive adhesive, and dry laminating the adhesive layer to a substantially specular substrate to form a laminate. The adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

In an eighth aspect, the invention is a method for making an optical display, including providing a substantially continuous layer of a structured pressure sensitive adhesive, and dry laminating the adhesive layer to a substantially specular optical display to form a laminate. The adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

In a ninth aspect, the invention is a method for applying a decal to a vehicle windshield, including providing a tape including a polymeric film with a first side and a second side, wherein the first side is imaged and the second side has applied thereon a substantially continuous layer of a pressure sensitive adhesive. The adhesive layer is bonded to a windshield to form an specular laminate structure, wherein the adhesive layer has a haze after lamination, measured according to ASTM D 1003-95, of less than about 50% of the haze of the adhesive layer before lamination. After dry lamination, the adhesive layer has a luminous transmittance of more than about 85%, a haze of less than about 25%, and an opacity of less than about 3%.

The pressure sensitive adhesive layer may be removed and repositioned on a substrate, and may be smoothly applied to the substrate using a dry lamination process. The adhesive layer bonds to substantially specular substrates, and the structures on the bonded adhesive layer substantially disappear to provide acceptable light transmission, haze and opacity for use in a substantially specular laminate.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a perspective view of a release liner suitable for forming a structured surface in an adhesive layer;

FIG. 6 is a perspective view of a structured surface adhesive layer formed on the release liner of FIG. 5;

Like reference symbols in the various drawings indicate like elements.

DETAILED DESCRIPTION

Figure 1:
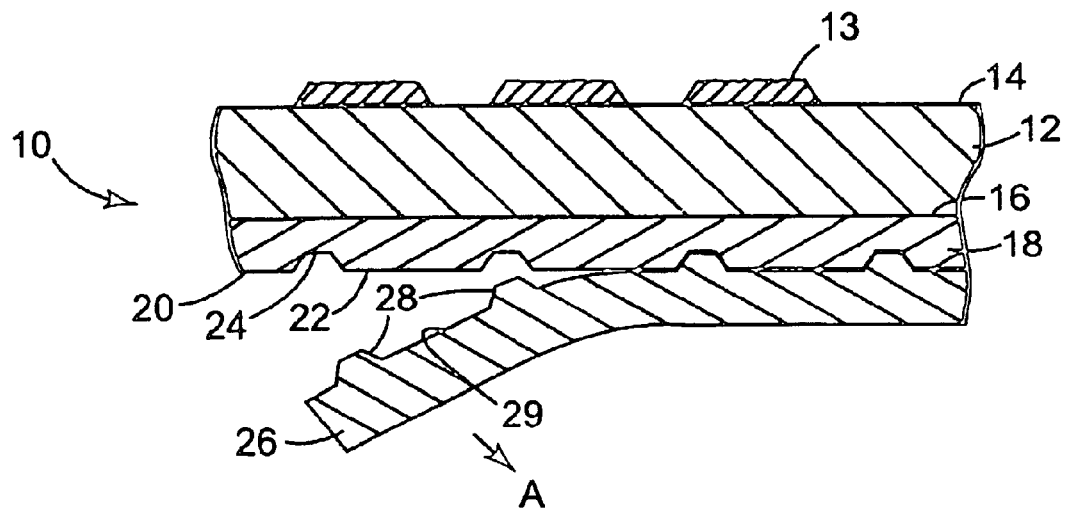
FIG. 1 is a cross-sectional view of a conventional adhesive-backed article.

In one aspect, the invention is a pressure sensitive adhesive layer with at least one structured surface. The adhesive layer is capable of being dry laminated to a substrate to form a laminate. The adhesive layer has a haze after lamination, measured according to ASTM D 1003-95, of less than about 50% of the haze of the adhesive layer before lamination. The adhesive layer after dry lamination has a luminous transmittance of more than about 85%, a haze of less than about 25%, and an opacity of less than about 3%.

Any pressure sensitive adhesive is suitable for the adhesive layer. Classes of suitable pressure sensitive adhesives include acrylics, tackified rubber, tackified synthetic rubber, ethylene vinyl acetate, silicone, and the like. Suitable acrylic adhesives are disclosed, for example, in U.S. Pat. Nos. 3,239,478, 3,935,338, 5,169,727, RE 24,906, 4,952,650, and 4,181,752. A suitable class of pressure sensitive adhesives is the reaction product of at least one alkyl acrylate with at least one reinforcing comonomer. Suitable alkyl acrylates are those having a homopolymer glass transition temperature below about −10° C. and include, for example, n-butyl acrylate, 2-ethylhexylacrylate, isooctylacrylate, isononyl acrylate, octadecyl acrylate and the like. Suitable reinforcing monomers include, for example, acrylic acid, itaconic acid, isobornyl acrylate, N,N-dimethylacrylamide, N-vinyl caprolactam, N-vinyl pyrrolidone, and the like.

Preferred pressure sensitive adhesive materials include, for example, acrylics, vinyl ethers, natural or synthetic rubber-based materials, poly(alpha-olefins), and silicones, and acrylics are particularly preferred.

The adhesives may be polymers that are dispersed in solvent or water and coated onto the release liner and dried, and optionally crosslinked. If a solvent borne or water borne pressure sensitive adhesive composition is employed, then the adhesive layer may undergo a drying step to remove all or a majority of the carrier liquid. Additional coating steps may be necessary to achieve a smooth surface. The adhesives may also be hot melt coated onto a structured liner or structured backing. Additionally, monomeric pre-adhesive compositions can be coated onto a liner and polymerized with an energy source such as heat, UV radiation, e-beam radiation, and the like. The thickness of the adhesive may vary widely depending on the intended application, and typically ranges from about 10 $\mu$m to about 500 $\mu$m, preferably from about 20 $\mu$m to about 100 $\mu$m.

The pressure sensitive adhesive can optionally include one or more additives such as, for example, initiators, fillers, plasticizers, tackifiers, chain transfer agents, fibrous reinforcing agents, woven and non-woven fabrics, foaming agents, antioxidants, stabilizers, fire retardants, viscosity enhancing agents, coloring agents, and mixtures thereof.

The pressure sensitive adhesive layer should preferably include at least one major surface with a structured topography. The structures on the surface of the adhesive layer have specific shapes that allow egress of air or other fluids trapped at the interface between the adhesive and the substrate during the lamination process. The structures allow the adhesive layer to be uniformly laminated to a substrate without forming bubbles that could cause imperfections in the resulting laminate.

The structures in the adhesive layer of the invention may be made as described in U.S. Pat. Nos. 6,197,397 and 5,260,215, which are each incorporated herein by reference. The topography may be created in the adhesive layer by any contacting technique, such as casting, coating or compressing. The topography may be made by at least one of: (1) casting the adhesive layer on a tool with an embossed pattern, (2) coating the adhesive layer onto a release liner with an embossed pattern, or (3) passing the adhesive layer through a nip roll to compress the adhesive against a release liner with an embossed pattern, and post-crosslinking the adhesive layer to prevent premature cold flow. The topography of the tool used to create the embossed pattern may be made using any known technique, such as, for example, chemical etching, mechanical etching, laser ablation, photolithography, stereolithography, micromachining, knurling, cutting or scoring.

Figure 2:
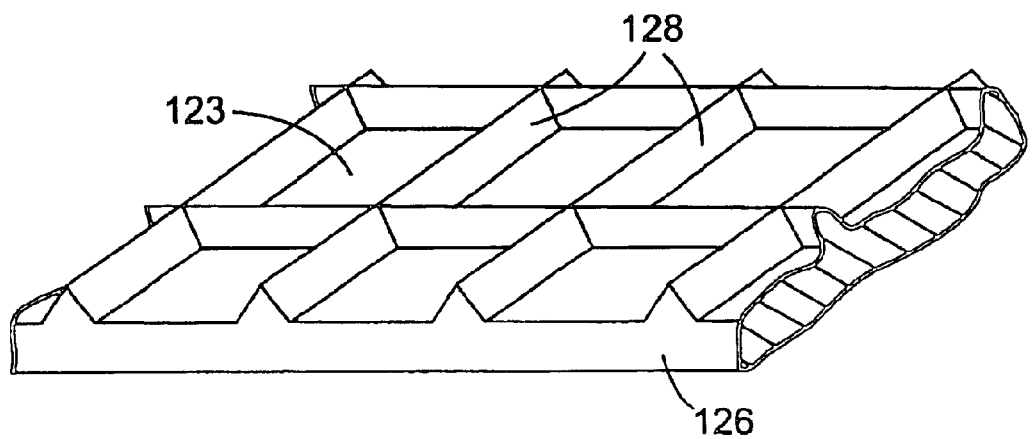
FIG. 2 is a perspective view of a release liner that may be used to make a structured adhesive layer.

Referring to FIG. 2, the liner 126 may be any release liner or transfer liner known to those skilled in the art that is capable of being embossed as described above. The liner 126 should also be capable of being placed in intimate contact with a pressure sensitive adhesive and subsequently removed without damaging the adhesive layer. Non-limiting examples of liners include materials from Minnesota Mining & Manufacturing Company (3M) of St. Paul, Minn., Rexam Corporation of Iowa City, Iowa, Daubert Coated Products of Westchester, Ill., P.S Substrates, Inc., Schoeller Technical Papers, Inc., AssiDoman Inncoat GMBH, and P. W. A. Kunstoff GMBH. The liner 126 is typically a polymer-coated paper with a silicone release coating, a polyethylene coated polyethylene terepthalate (PET) film with silicone release coatings, or a cast polyolefin film with a silicone release coating. The adhesive layer and/or release liner may optionally include additional non-adhesive structures such as, for example, those described in U.S. Pat. Nos. 5,296,277; 5,362,516; and 5,141,790. These structured adhesive layers with non-adhesive structures are available from 3M. St. Paul, Minn., under the trade designation Controltac Plus.

The structures on the adhesive layer (and the corresponding structures on the release liner) are preferably microscopic in at least two dimensions, i.e. the topical and/or cross-sectional view is microscopic. The term microscopic as used herein refers to dimensions that are difficult to resolve by the human eye without aid of a microscope. One useful definition of microscopic is found in Smith, *Modern Optic Engineering*, (1966), pages 104–105, wherein visual acuity is defined and measured in terms of the angular size of the smallest character that can be recognized. Normal visual acuity allows detection of a character that subtends an angular height of 5 minutes of arc on the retina.

The structures on the release liner and adhesive layers are preferably substantially continuous, which as used herein means that the adhesive layer is applied to a carrier such as a backing or release liner such that there are no adhesive free zones where the carrier is left exposed. However, as well known in the art, the continuous adhesive may be bounded at its periphery with exposed carrier to enhance handleability and removeability of a tape construction. The surface of the carrier may have applied thereon regions of different adhesives, such as for example, alternating strips of two different adhesive formulations, or may include multiple layers, each with different adhesive formulations.

The structures form a regular or a random array or pattern. Regular arrays or patterns include, for example, rectilinear patterns, polar patterns cross-hatch patterns. The patterns may be aligned with the direction of the carrier web, or may be aligned at an angle with respect to the carrier web. The pattern of structures may optionally reside on both major, opposing surfaces of the adhesive layer. This allows individual control of air egress and surface area of contact for each of the two surfaces to tailor the properties of the adhesive to two different interfaces.

The pattern of structures defines substantially continuous open pathways or grooves that extend into the adhesive layer from an exposed surface. The pathways either terminate at a peripheral portion of the adhesive layer or communicate with other pathways that terminate at a peripheral portion of the article. When the article is applied to a substrate, the pathways allow egress of fluids trapped at an interface between the adhesive layer and a substrate. The pathways created by the pattern of structures should occupy a minimum volume per unit area of the adhesive layer to adequately permit fluid egress at the interface of the substrate and the adhesive. Preferably, the pattern of structures defines a volume of at least $1 \times 10^3$ $\mu$m$^3$ on any 500 $\mu$m diameter circular area in a two-dimensional plane of the adhesive layer. Most preferably, the pattern of structures defines a volume of above $1.0 \times 10^3$ $\mu$m$^3$ to about $1 \times 10^7$ $\mu$m$^3$ on any 500 $\mu$m diameter circular area of the adhesive layer.

The shapes of the structures in the adhesive layer may vary widely depending on the level of fluid egress and peel adhesion required for a particular application, as well as the surface properties of the substrate. Protrusions (structures extending above the plane of the adhesive layer or release liner) and depressions (structures extending below the plane of the adhesive layer or release liner) may be used, and the structures may be continuous to form grooves in the adhesive layer. Suitable shapes include hemispheres, right pyramids, trigonal pyramids, square pyramids, quadrangle pyramids, and "V" grooves, for reasons of pattern density, adhesive performance, and readily available methodology for producing the structures. The structures may be systematically or randomly generated.

Figure 3:
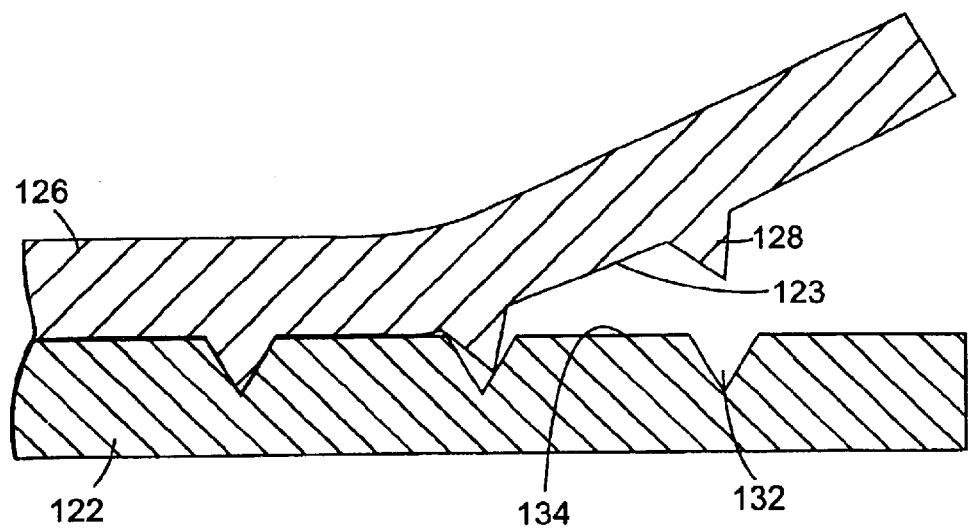
FIG. 3 is a cross-sectional view of a removable structured release liner and an associated structured adhesive layer.

A typical release liner 126 used to create an embossed pattern in the adhesive layer is shown in FIG. 2. The release liner 126 includes a pattern of raised V-shaped ridges 128 separated by substantially planar land areas 123. As illustrated in FIG. 3, an adhesive layer 122 is preferably coated on the embossed release liner 126 to create the embossed pattern. When the release liner 126 is removed, the adhesive layer 122 has a topography with substantially V-shaped grooves 132 and land areas 134 that is essentially the inverse of the topography of the raised ridges 128 and land areas 123 on the backing or release liner 126.

In the embodiments of FIGS. 2–3, the grooves 132 in the adhesive form substantially continuous open pathways that extend into the adhesive from an exposed surface. The grooves either terminate at the peripheral portion of the adhesive layer or communicate with other channels that terminate at a peripheral portion of the article. When the article is applied to a substrate, the pathways provide an egress to a periphery of the article for fluid trapped at the interface between the adhesive layer and the substrate.

Figure 4:
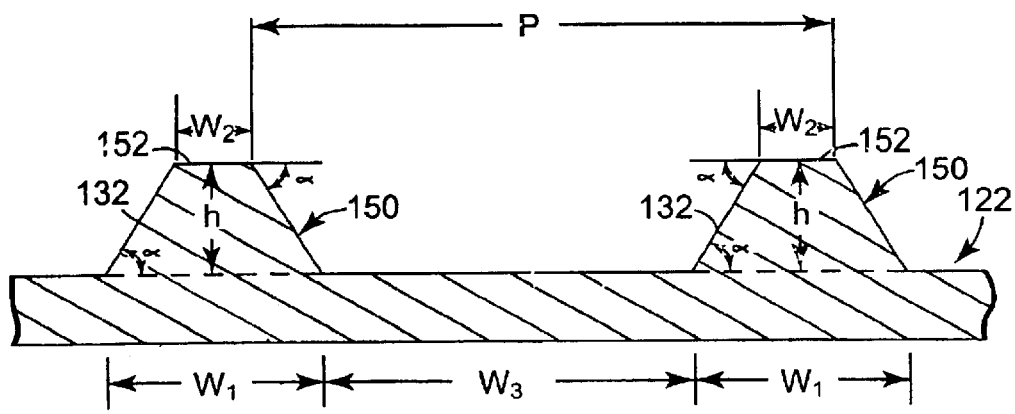
FIG. 4 is a cross-sectional view of a structured adhesive layer of the invention.

Referring to FIG. 4, the adhesive layer 122 includes structures 150. The dimensions of the structures may vary widely depending on the rheology of the adhesive layer and the application conditions. Preferably, the pitch P between the structures 150 is about 5 $\mu$m to about 2500 $\mu$m, more preferably about 25 $\mu$m to about 1300 $\mu$m. The height h of each structure 150 from a plane of the adhesive layer 122 is preferably about 3 $\mu$m to about 45 $\mu$m, more preferably about 10 $\mu$m to about 30 $\mu$m. The width of the structure 150 at its base $W_1$ is preferably less than about 200 $\mu$m. The distance $W_2$ across the top 152 of the structure 150 is preferably about 0 $\mu$m to about 300 $\mu$m. The distance $W_3$ between the bases of the structures 150 is preferably about 0 $\mu$m to about 300 $\mu$m. The structure 150 has at least one sidewall 132 that makes an angle $\alpha$ with respect to a plane of the surface of the adhesive layer 122. The angle $\alpha$ may be selected from an angle greater than 0° and less than 90°, preferably less than about 50°, measured with respect to the plane of the surface of the adhesive layer 122.

In another embodiment, an adhesive layer may be coated and/or laminated on the embossed release liner 226 shown in FIG. 5, which include pyramidal depressions extending below a plane 223 of the release liner. When the release liner 226 is removed, the resulting adhesive layer 318, which is shown in FIG. 6, includes pyramidal protrusions 328 corresponding to the pyramidal depressions 228 in the release liner 226. The pyramidal protrusions 328 extend upward from a plane 323 of the adhesive layer, which forms an array of substantially continuous channels in the adhesive layer.

Figure 7A:
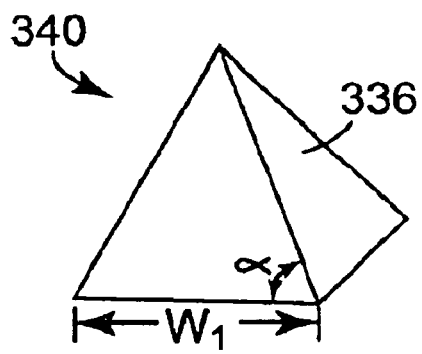
FIG. 7A is a perspective view of a pyramidal structure that may be used in an adhesive layer.

FIG. 7A illustrates a quadrangle pyramid 340 as an illustration of one embodiment suitable for use as structure in the adhesive layer 318 of the invention. The structure 340 includes at least one sidewall 336 that makes an angle $\alpha$ with respect to a plane of the surface of the adhesive layer (not shown in FIG. 7A). The angle $\alpha$ may be selected from an angle greater than 0° and less than 90°, measured with respect to the plane of the surface of the adhesive layer 22. The angle $\alpha$ is preferably greater than about 5° and less than about 40°, more preferably less than about 20°, and most preferably about 8° to about 17°. The structure 340 has a base with a width $W_1$.

Figure 7B:
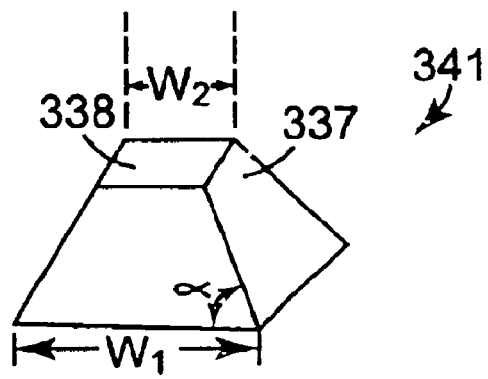
FIG. 7B is a perspective view of a truncated pyramidal structure that may be used in an adhesive layer.
Figure 8:
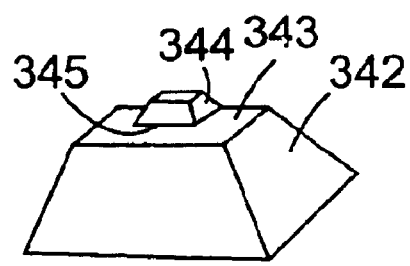
FIG. 8 is a perspective view of a truncated, multi-level pyramidal structure that may be used in an adhesive layer.

Referring to FIG. 7B, the pyramidal structures may be truncated. The truncated structure 341 has a base with a width $W_1$ and a flat top surface 338 with a width $W_2$. Referring to FIG. 8, double-featured structures may also be used in the adhesive layer of the invention. The stacking or use of two structures reduces the initial contacting surface of the adhesive, which may have an impact on initial adhesion to a selected substrate material. FIG. 8 illustrates a truncated, quadrangle pyramid 342 with an exposed upper surface 343. A second quadrangle pyramid 344, having a base 345, is positioned on the exposed surface 343. In general, the base surface of a second structure is smaller than the exposed surface of the first feature. Additionally, different configurations or shapes may be combined with base structures to achieve the desirable positioning properties for the present invention.

Figure 9:
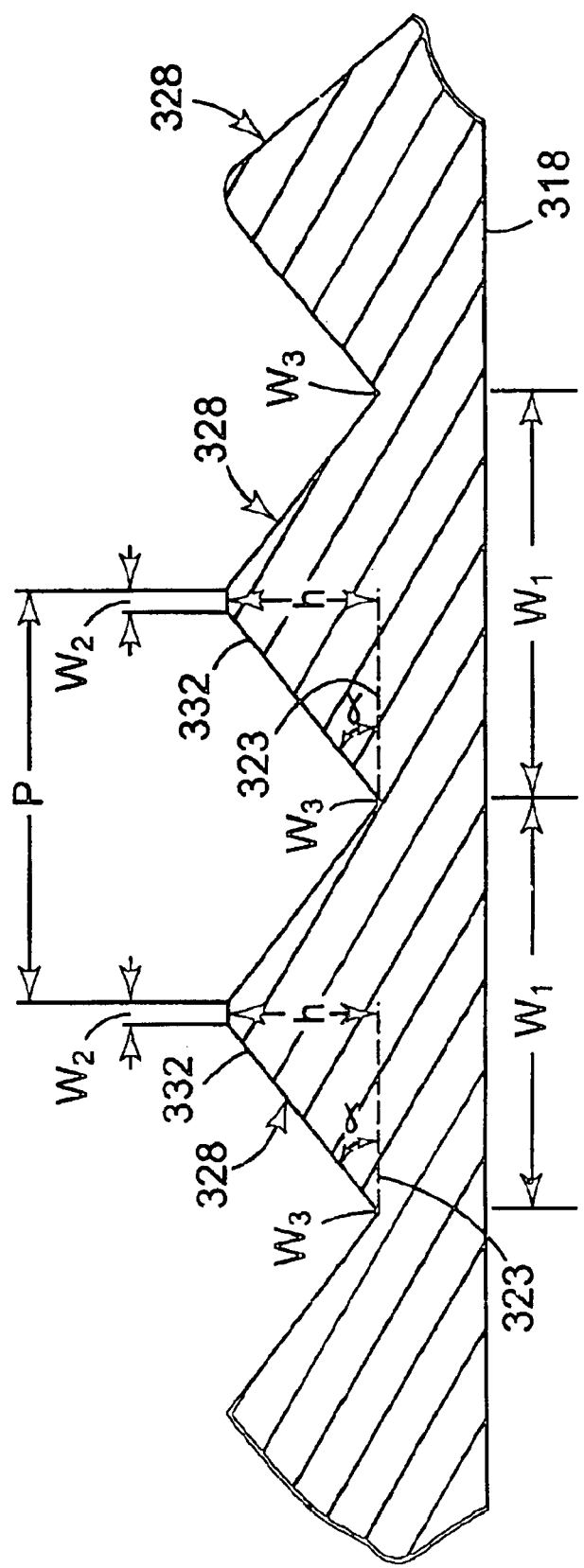
FIG. 9 is a cross-sectional view along line A—A of FIG. 6 showing the dimensions of a protrusion on an adhesive layer.

Referring to FIG. 9, a section of the adhesive layer 318 along line A—A (FIG. 6) is shown that includes a plurality of pyramidal protrusions 328 extending above the plane 323 of the adhesive layer. The dimensions of the protrusions may vary widely depending on the rheology of the adhesive layer and the application conditions, and should be selected to provide adequate balance between adhesion to substrate and fluid egress. Preferably, the pitch P between the protrusion 328 is up to about 400 $\mu$m, more preferably about 150 $\mu$m to about 350 $\mu$m. The height h of each protrusion 328 from a plane 323 of the adhesive layer 318 is preferably greater than about 8 $\mu$m and up to about 35 $\mu$m, more preferably about 10 $\mu$m to about 30 $\mu$m. The width $W_1$ of the protrusion 328 at its base is typically greater than about 150 $\mu$m. The distance $W_2$ may vary widely depending on the balance of adhesion to substrate and fluid egress, and should typically be less than about 50% of the width of the base $W_1$. Preferably, $W_2$ is about 0 $\mu$m (pointed top) to about 20 $\mu$m (truncated), more preferably about 2 $\mu$m to about 5 $\mu$m. The gap $W_3$ between the pyramidal protrusions 328 is preferably less than about 10 $\mu$m, more preferably about 2 $\mu$m to about 6 $\mu$m. The protrusions 328 have at least one sidewall 332 that makes an angle $\alpha$ with respect to a plane 323 of the surface of the adhesive layer 318. The angle $\alpha$ is preferably selected from an angle greater than about 5° and less than about 40°, more preferably about 8° to about 17°.

Figure 10A:
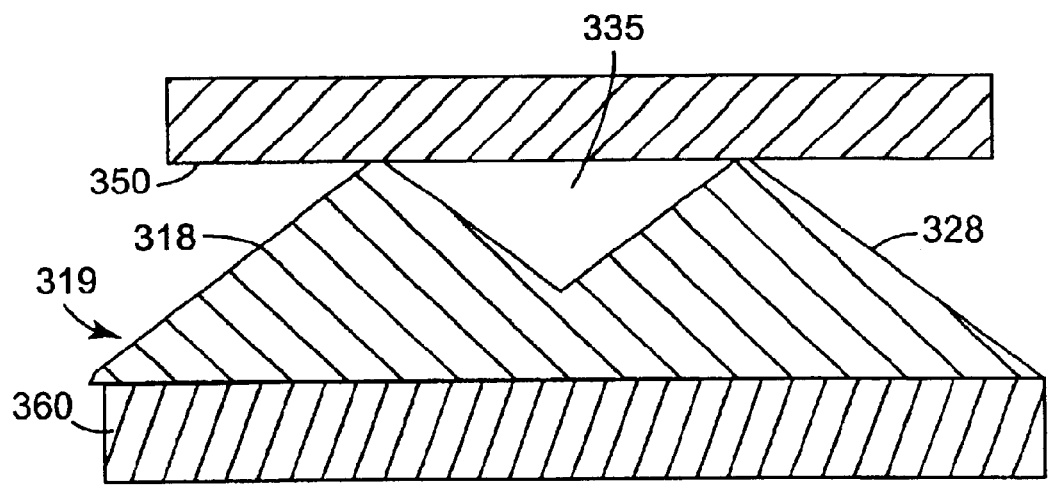
FIG. 10A is a cross-sectional view of an adhesive layer as it is initially contacted with a substrate.
Figure 10B:
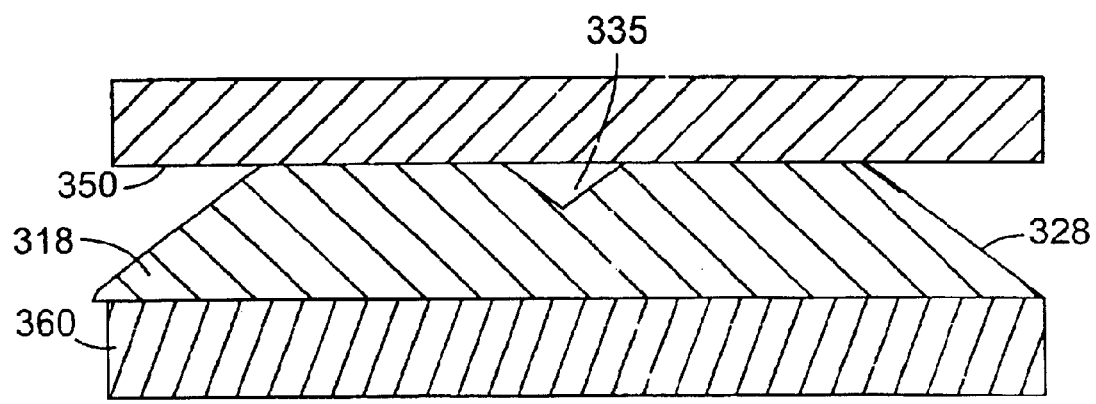
FIG. 10B is a cross-sectional view of a graphic article after adequate adhesion to a substrate has been achieved.

Referring to FIGS. 10A and 10B, a first laminate includes a substrate 360 and an adhesive layer 318 with a structured surface 319. Once the release liner 126 (not shown in FIGS. 10A and 10B) is removed, the exposed surface 319 of the structured adhesive layer 318 may be contacted with a second substrate 350 to form a second laminate. The substrates 350, 360 may be rigid or flexible. Examples of suitable substrates 350, 360 include glass, metal, plastic, wood, and ceramic substrates, painted surfaces of these substrates, and the like. Representative plastic substrates include polyester, polyvinyl chloride, ethylene-propylenediene monomer rubber, polyurethanes, polymethyl methacrylate, engineering thermoplastics (e.g., polyphenylene oxide, polyetheretherketone, polycarbonate), and thermoplastic elastomers. The substrate may also be a woven fabric formed from threads of synthetic or natural materials such as, for example, cotton, nylon, rayon, glass or ceramic material. The substrate may also be made of a nonwoven fabric such as air laid webs of natural or synthetic fibers or blends thereof. Preferably, the substrates are substantially specular materials, such as glass, clear polymeric materials and the like. the adhesive forms a substantially specular adhesive layer when permanently bonded to a substrate. The term substantially specular as used in this application refers to a material that absorbs substantially no light over a wavelength region of interest; i.e. substantially all light over the wavelength region of interest that falls on the surface of the substantially specular material is reflected or transmitted.

The substrate may be surface modified with patterns and grooves if desired, but it is preferred that the surface topography of the substrate be completely independent of the structured pattern in the adhesive layers. Preferably the substrate is substantially smooth, which in this application means substantially free of patterns and other surface structures, such as protrusions and grooves. As resolution increases, patterns may appear as defects in a laminate construction.

Referring to FIG. 10A, as the adhesive layer 318 is initially contacted with the first substrate 350, the pyramidal protrusions 328 contact the surface of the substrate, and the areas 335 between the protrusions 328 function as channels for fluid egress. This allows pockets of trapped air between the adhesive layer and the substrate to be easily removed.

The structures on the adhesive layer should preferably be shaped and distributed on the surface of the adhesive layer, and the rheology and surface characteristics of the adhesive should be selected, such that the adhesive layer is temporarily removable from the substrate after dry lamination. The shape of the structures in response to the relative surface affinity of the adhesive layer to the substrate should be balanced with the elastic recovery forces in the adhesive. This shape change will take place on a size scale of the order of micrometers for the structures described above.

After removal of the protective release liner, the structures on the surface of the adhesive layer retain their shape for a sufficient time to maintain the fluid egress properties of the adhesive layer. The selection of the adhesive also plays a role in determining the long-term properties of the structured adhesive layer. A pressure sensitive adhesive should preferably be selected with rheological properties and surface characteristics such that the adhesive forces between the structured adhesive layer and the target substrate are stronger than the elastomeric recovery forces of the portion of the structured adhesive deformed upon application of the coating to the substrate. This allows wetting between the adhesive layer and the substrate to increase over time, which leads to a corresponding increase of peel adhesion levels and a strengthened bond with the substrate surface. In addition to the shape and distribution of the structures described above, the composition and rheological properties of the adhesive, the surface specific characteristics of the adhesive and the substrate, and the application conditions must also be considered to generate a predetermined level of peel adhesion to a selected substrate material such that the resulting laminate will have sufficient structural integrity and optical clarity for a particular application. After pressure is applied, the structures on adhesive substantially collapse and increase the amount of adhesive in contact with the substrate.

Referring to FIG. 10B, after adequate application consistent with techniques known in the art, the channels 335 at least partially disappear to provide the desired adhesion to the substrates 350. In the specular laminates of the invention, the channels' size and dimensions are selected for a specific pressure sensitive adhesive composition to obtain a result of at least 85% according to the percentage wet out test described in the Examples section below. The proper wet out indicates that a sufficient seal and bond is formed between the adhesive layer 318 and the substrate 350.

After pressure is applied to begin dry lamination to the substrate, the structures on the adhesive layer also substantially disappear to provide acceptable light transmission, haze and opacity for use in a specular laminate structure. Preferably, the structures on the adhesive layer should collapse so that the haze of the adhesive layer after dry lamination is less than about 50%, preferably less than about 10%, more preferably less than about 3%, and most preferably less than about 1%, of the haze of the adhesive layer before dry lamination, as measured according to ASTM D 1003-95. The adhesive layer should not interfere with light transmission over the wavelength region of interest. After dry lamination, the adhesive layer has a luminous transmittance of at least about 85%, more preferably about 95% to about 99.9%, and a haze of less than about 25%, more preferably less than about 5%, and most preferably less than about 2%, as measured according to ASTM D 1003-95. After dry lamination, the adhesive layer has an opacity of less than about 3%, more preferably less than about 1%, and most preferably about 0.5%, as measured by a spectrophotometer using well known analysis techniques.

Figure 11A:
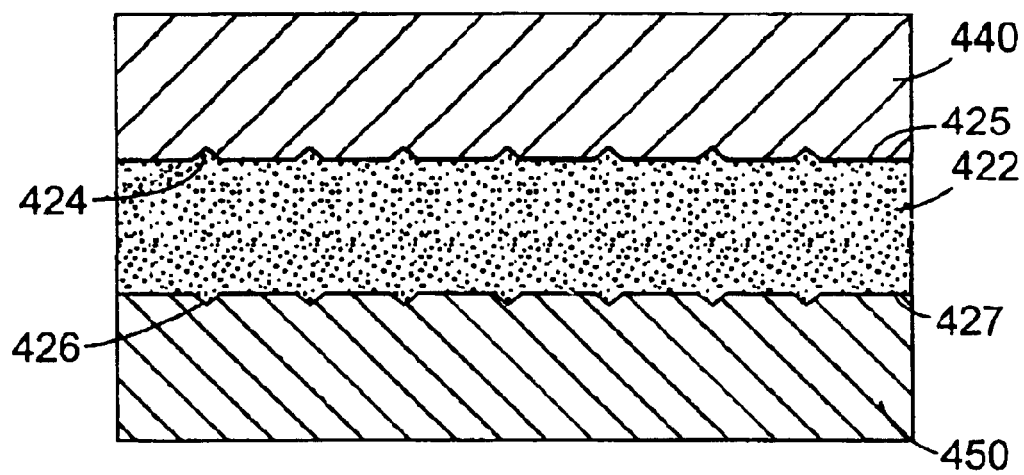
FIG. 11A is a cross-sectional view of a transfer tape with a structured adhesive layer.

The patterned adhesive layer described above may be supplied in many forms, but for most applications it is included as part of a tape construction. For example, as shown in FIG. 11A, a transfer tape 410 may include an adhesive layer 422 having an optional removable first release liner 440 on a first major surface 425 and an optional removable second release liner 450 on a second major surface 427. Either one or both of the release liners 440, 450 may be embossed to create a pattern of structures 424, 426 on either major surface of adhesive layer 422.

Figure 11B:
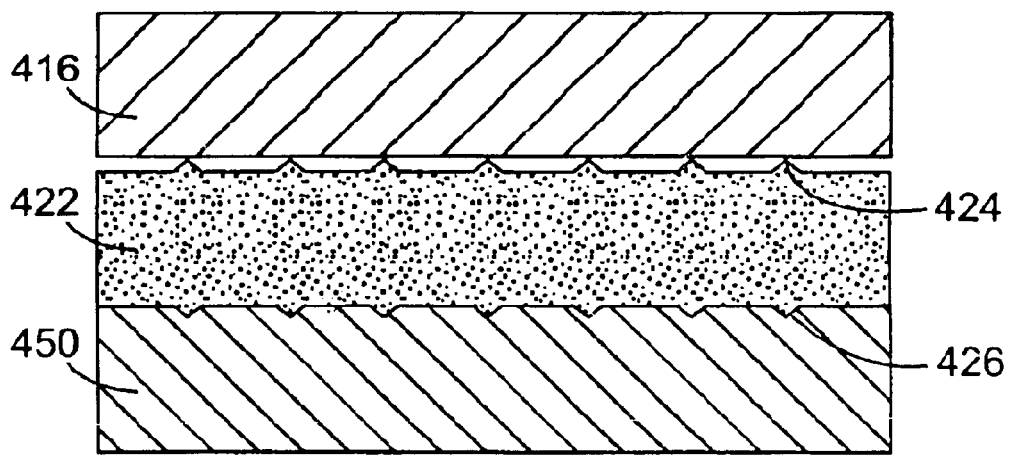
FIG. 11B is a cross-sectional view of a laminate structure made with the transfer tape of FIG. 11A.
Figure 11C:
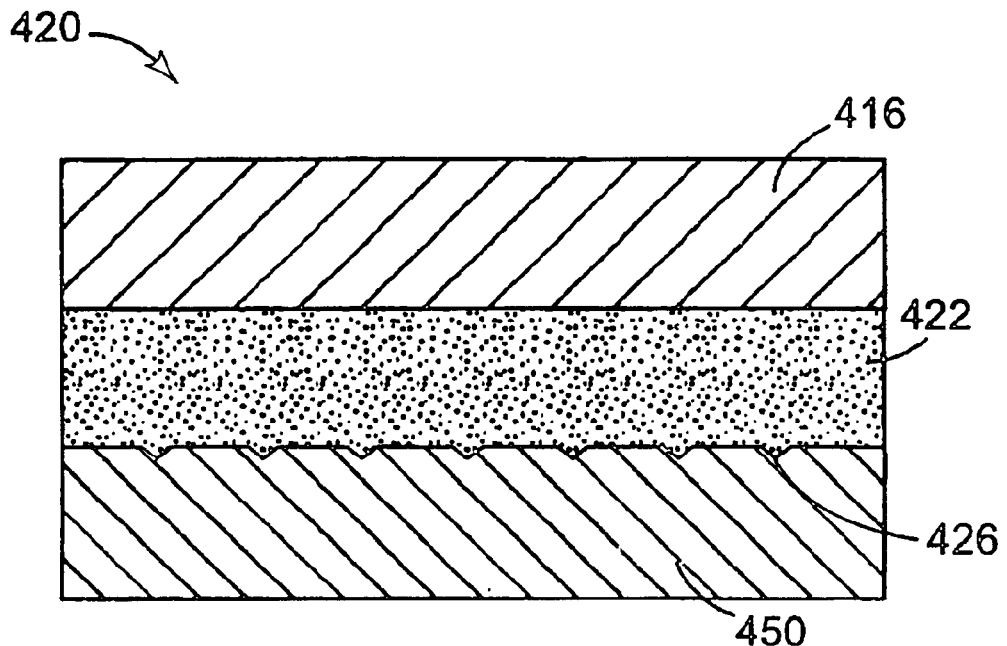
FIG. 11C is a cross-sectional view of a laminate structure made with the transfer tape of FIG. 11A.
Figure 11D:
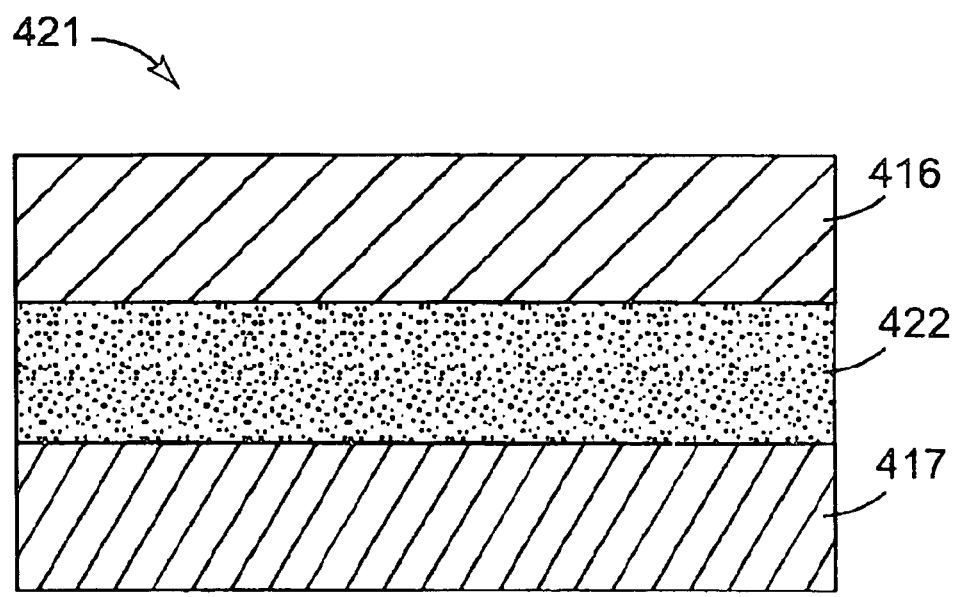
FIG. 11D is a cross-sectional view of a laminate structure made with the transfer tape of FIG. 11A.

Referring to FIG. 11B, if either of the release liners 440, 450 is peeled away and removed, the adhesive layer 422 may be initially adhered to a substantially specular substrate 416 to form a laminate structure 420. During the retention period of the adhesive layer 422, the substrate 416 rests substantially on the structures 424, which allows air or other fluids to bleed to the edges of the laminate and move to the surrounding atmosphere. At the conclusion of the retention period, the structures 424 substantially disappear and the adhesive layer 422 forms a permanent bond with the substrate 416 (FIG. 11C). At this point the laminate 420 is substantially specular and has the light transmittance, haze and opacity required for a particular application. Referring to FIG. 11D, if the release liner 450 is removed, the adhesive layer 422 may be bonded to a second substantially specular substrate material 417 to make a laminate 421. The laminate 421 is also substantially specular and has the light transmittance, haze and opacity required for a particular application.

Figure 12:
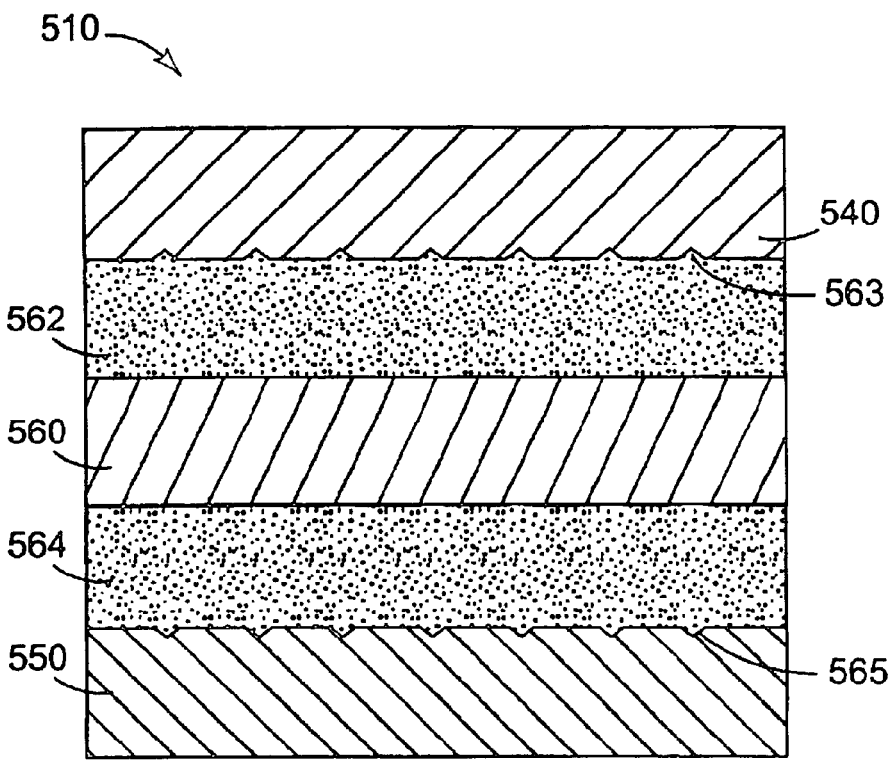
FIG. 12 is a cross-sectional view of a double-coated tape with a structured adhesive layer.

In a double-coated tape construction, an adhesive layer is provided on the opposed major surfaces of a substrate. In these double-coated tape constructions the adhesive layer on one or both sides of the backing may be embossed to create a structured pattern. Referring to FIG. 12, a double-coated tape construction 510 is shown with a first adhesive layer 562 on a first side of a substantially specular substrate 560, and a second adhesive layer 564 on a second side of the substrate 560. An optional first removable release liner 540 is applied on the first adhesive layer 562, and an optional second removable release liner 550 is applied on the second adhesive layer 564. Either one or both release liners 540, 550 may be embossed to create a structured pattern, in this embodiment grooves 563, 565, on a major surface of the adhesive layers 562, 564. As is well known in the art, the tape construction 510 may also include primer layers such as those described in EP 372,756, incorporated herein by reference. The tape construction may also include other adhesion promoting layers to enhance adhesion between the layers of the construction. For clarity, these adhesion-promoting layers are not shown in FIG. 12 or elsewhere in the present application. In addition, the layers may be treated or surface modified using techniques well known in the art, such as, for example, corona treatment, to enhance interlayer adhesion.

Figure 13:
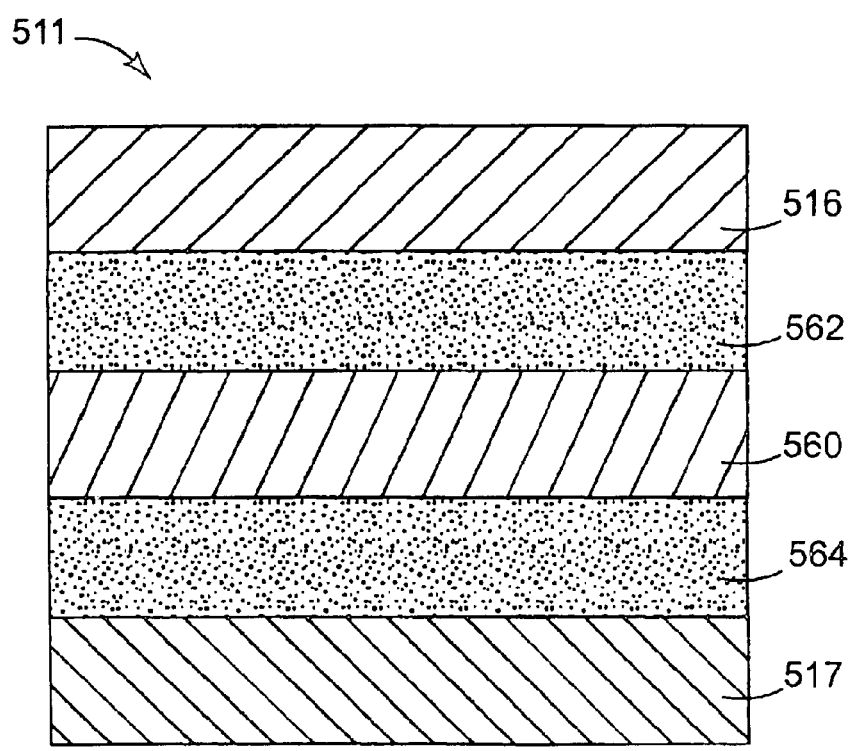
FIG. 13 is a cross-sectional view of a laminate structure made with the double coated tape of FIG. 12.

Referring to FIG. 13, if either of the release liners is removed, the tape 510 may be applied to a substantially specular substrate or between a pair of substantially specular substrates 516, 517 to form a substantially specular laminate construction 511. The laminate 511, which is shown after the retention period has ended and bonding is complete, has the light transmittance, haze and opacity required for a particular application.

Figure 14:
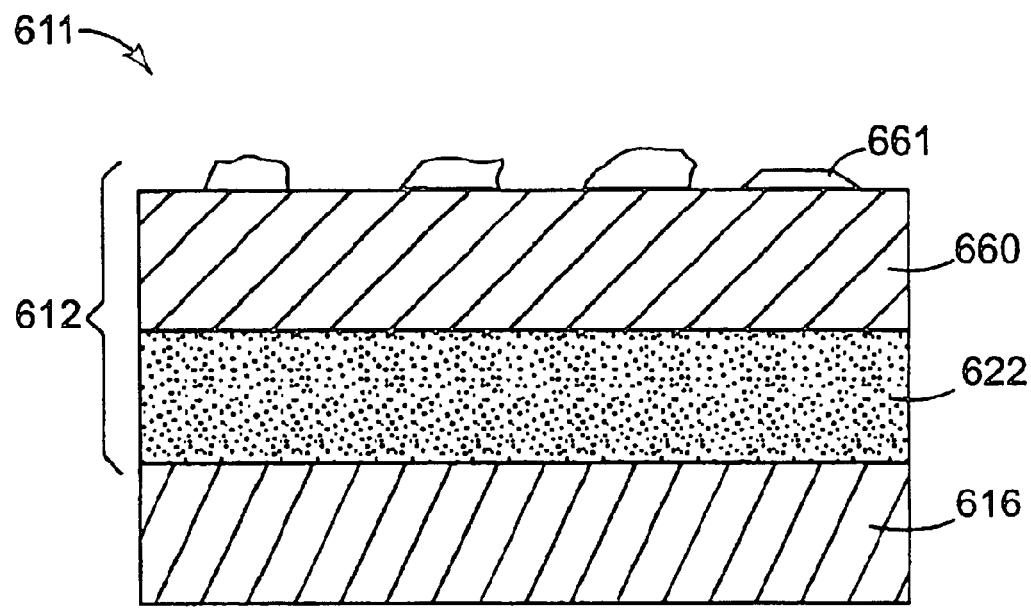
FIG. 14 is a cross-sectional view of a laminate structure made with a decal having a structured adhesive layer.

A preferred laminate construction 611 is illustrated in FIG. 14. To make the laminate structure 611, a decal 612 is adhered to a substantially specular substrate 616 such as, for example, a vehicular windshield. The decal 612 includes a substrate 660 with a structured adhesive layer 622 on one surface, and an image 661 on an opposed surface.

Figure 15:
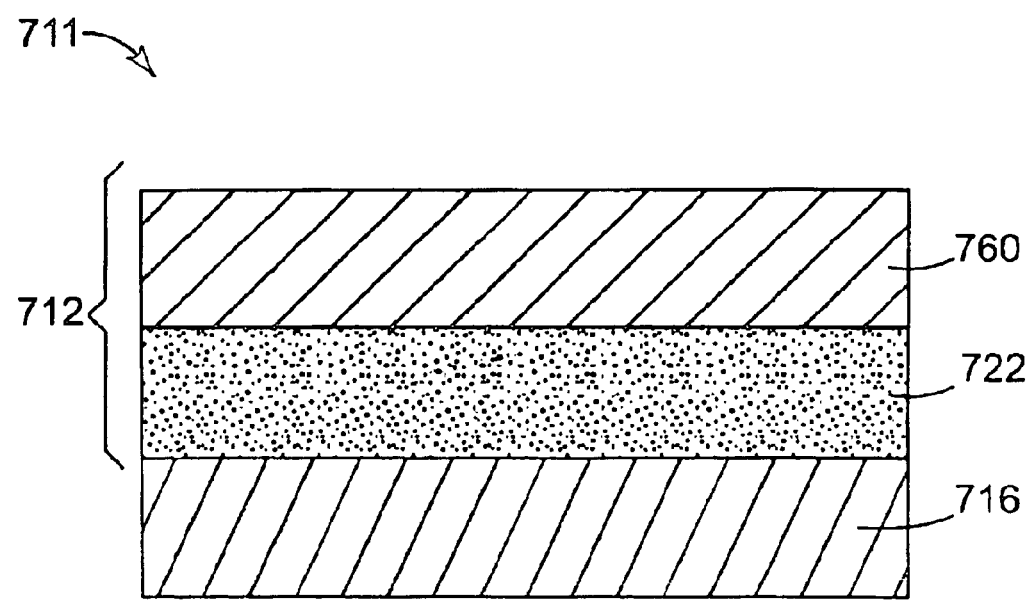
FIG. 15 is a cross-sectional view of a laminate structure including an optical display and a tape having a structured adhesive layer.

Another preferred laminate structure 711 is illustrated in FIG. 15. To make the laminate structure 711, a polarizing or brightness enhancement film 712 is adhered to an specular substrate 716 such as, for example, an optical display. The film 712 includes a substrate 760 with a structured adhesive layer 722 on one surface. The film substrate 760 may have multiple layers (not shown in FIG. 15).

The invention will now be illustrated with the following non-limiting examples.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
|---|---|
| AA | Acrylic acid |
| AL | After Lamination, test data were taken of the tape after lamination to a substrate |
| BA | Butyl Acrylate |
| BL | Before Lamination, test data were taken of the tape before lamination to a substrate |
| DL | Double Lamination, test data were taken of the transfer tape after lamination to 2 substrates |
| DMA | N,N-dimethyl acrylamide |
| DMS | Double microstructure, a transfer tape with both sides having a microstructure pattern |
| Glass Microscope Slides | 75 millimeter × 50 millimeter × 1 millimeter Corning No. 2947 Microslides commercially available from Corning Glass Works; Corning, NY |
| HEA | 2-Hydroxyethyl acrylate |
| IBOA | Isobornyl acrylate |
| IOA | Isooctyl acrylate |
| IRGACURE 651 | Photo curing agent 2,2 dimethoxy-2-phenylacetophenone, available from Ciba; Hawthorne, NJ |
| IV | Intrinsic Viscosity |
| MA | Methyl acrylate |
| MMA | Methyl methacrylate |
| NL | No Lamination, test data were taken of the transfer tape before lamination to any substrate |
| PET | Polyester film of polyethylene terephthalate having a thickness of 50 micrometers |
| SL | Single Lamination, test data were taken of the transfer tape after lamination to a single substrate |

Test Methods
Luminous Transmittance and Haze

The luminous transmittance and haze of all samples were measured according to American Society for Testing and Measurement (ASTM) Test Method D 1003-95 ("Standard Test for Haze and Luminous Transmittance of Transparent Plastic") using a TCS Plus Spectrophotometer from BYK-Gardner Inc.; Silver Springs, Md. Sample preparation details are described in the text.

Opacity

The same samples used for haze and luminous transmittance measurements were used for opacity measurement. The BYK Gardner TCS Plus Spectrophotometer was used for opacity measurement, with the standard size reflectance port (25 mm) installed, and diffuse reflectance (specular excluded) was measured.

Percentage Wet-Out

This technique is used to study the wetting of an adhesive having a microstructured surface onto a smooth transparent substrate. The hardware used with this technique consists of a stereo-microscope (Olympus Model SZH-ZB), a video-camera (Cohu Model 4815) mounted on the microscope, a coaxial vertical illuminator (Olympus Model TL2), and a computer (Hewlett-Packard Vectra QS/20) with a video digitizing board (Imaging Technologies PCVISIONplus) installed which allows the computer to capture and digitize an image. Such an image can subsequently be stored and analyzed by commercial software packages (Jandel JAVA). The coaxial vertical illuminator provides light which is sent through the lens (i.e., the optic axis) to illuminate the subject. This light passes through a circular polarizer mounted on the end of the planar objective lens of the microscope. In practice, the procedure is as follows:

1. Apply the adhesive tape onto a glass (or other specular and flat) surface with one pass of a 2 kg roller.
2. Position the laminate so that the adhesive/glass interface is viewed through the glass by a stereo microscope.
3. Adjust the sample so that the glass is perpendicular to the optic axis.
4. Adjust the circular polarizer to optimize light intensity and contrast.
5. Using the image analysis software, capture and digitize the image.
6. Set the software grey value window of acceptance to accept only those grey values (i.e., brightness levels) corresponding to the wet areas.
7. Upon application of the tape, analyze the total wetted area as a percentage of the total imaged area.

Peel Adhesion

The peel adhesion test is similar to the test method described in ASTM D 3330-90, substituting a glass substrate for the stainless steel substrate described in the test.

Adhesive coated samples were cut into 1.27 cm by 15 cm strips. Each strip was then adhered to a 10 cm by 20 cm clean, solvent washed glass coupon using a 2 kg roller passed once over the strip. The bonded assembly dwelled at room temperature for about one minute and was tested for 180° peel adhesion using an IMASS slip/peel tester (Model 3M90, commercially available from Intrumentors, Inc., Strongville, Ohio) at a rate of 0.31 m/min (12 in/min) over a five second data collection time.

Adhesives
Adhesive A

A solvent based acrylic pressure sensitive adhesive A was prepared according to conventional radical thermal polymerization procedure using 96 parts isooctylacrylate and 4 parts DMA. The PSA was about 18% solids in ethyl acetate/heptane, about 2500 cps, IV 1.25 to 1.40.

Adhesive B

A water-based acrylic pressure sensitive adhesive B was prepared according to the pressure sensitive adhesive (PSA)

copolymer procedure of U.S. Pat. No 6,013,722 Example 1, incorporated herein by reference, using BA/MMA/HEA 75/10/15 composition.

Adhesive C

A mixture of 14 parts of BA, 6 parts of HEA and 0.012 part of IRGACURE 651 were mixed in a glass vessel. After nitrogen de-gas, the mixture was irradiated with a GE Blacklight lamp (F15T8-BL, 15W, USA) for about 20 seconds, so that a syrup was formed with viscosity about 2000 cps to 3000 cps. The BA/HEA ratio was 70/30.

Adhesive D

The same procedure used for Adhesive C was followed with the monomers IOA, IBOA, and AA to give a IOA/IBOA/AA ratio of 83/16/1.

Adhesive E

The same procedure used for Adhesive C was followed to give a BA/HEA ratio of 95/5.

Embossing rolls were cut with diamond tools or laser machined to provide patterns having varying pitch, depth, widths at the top of the channel and at the base of the channel, and base angles. Polyethylene coated paper and PET-backed release liners having a silicone coating over the polyethylene, such as those available from Rexam or Inncoat, were embossed between a heated rubber roll and each of the embossing roll to produce microstructured liners with ridges.

The dimensions of the microstructures on the liners are shown in Table 1 and have the shape of inverted square pyramids or V-grooves. The pitch is the distance from one microstructure to the same point on the adjacent microstructure, the height is the height of the microstructure from the base of the channel, $W_1$ is the length of the top of the trapezoidal channel and $W_2$ is the length of the bottom of the trapezoidal channel.

TABLE 1

| Pattern | Pattern Description | Liner Core | Pitch (μm) | Height (μm) | W1 (μm) | W2 (μm) |
|---|---|---|---|---|---|---|
| P1 | Square pyramid | PET | 200 | 15 | 200 | 1 |
| P2 | V-groove | Paper | 200 | 10 | 200 | 1 |
| P3 | V-groove | Paper | 100 | 10 | 100 | 1 |
| P4 | V-groove | Paper | 50 | 10 | 50 | 1 |
| P5 | V-groove | PET | 50 | 25 | 50 | 1 |
| P6 | V-groove | PET | 30 | 15 | 30 | 1 |
| P7 | Truncated square pyramid, Waffle Pattern | PET | 197 | 15 | 18 | 1 |
| P8 | Glass beads[1] | Paper | | | | |
| P9 | Truncated Square Pyramid[2] | Paper | 197 | 25 | 197 | 3 |
| P10 | Square Pyramid | Paper[3] | 200 | 15 | 200 | 1 |
| P11 | Cube Corner[4] | PET | | | | |
| P12 | Flat bottom Depressions[5] | PET | | | | |
| P13 | Round Bottom Depressions[6] | PET | | | | |

[1]Liner described in U.S. Pat. No. 5,260,215, Example 3.
[2]Includes a second feature with a base angle of 60°, as described in WO 00/69985, Example 6.
[3]Paper liner described in U.S. Pat. No. 6,197,397, Example 43, with square pyramid embossing.
[4]Liner described in U.S. Pat. No. 5,138,488, Comparative Example A.
[5]Liner described in U.S. Pat. No. 5,141,790, Example 2.
[6]Liner described in U.S. Pat. No. 5,141,790, Example 3.

The optical properties of the substrates PET and Glass Microscope Slides were tested for luminous transmittance, haze and opacity as a reference point for when these substrates are used in laminates. These values are shown in Table 2.

TABLE 2

| | Luminous | Haze (%) | | Opacity (%) | |
|---|---|---|---|---|---|
| Substrate | Transmittance (%) | C2° | A2° | C2° | A2° |
| PET | 88.8 | 0.8 | 0.8 | 0.5 | 0.5 |
| Glass Microscope Slide | 92.4 | 0.1 | 0.1 | 0.2 | 0.2 |

Example 1

Adhesive A was solvent cast on the liner with pattern P1 with a knife coater, dried in a 65° C. oven for 15 minutes to yield a dry coating thickness of 25 micrometers. The exposed adhesive side of the PSA film was laminated at room temperature to a 50 micron PET. The lamination was made using a two roll nip to provide uniform PET/PSA/Liner laminates. The P1 liner was removed to form a tape with exposed microstructured PSA surface. Samples of this tape were tested for luminous transmittance, haze and opacity. The data are shown in Table 3 BL (before lamination to glass). Samples of the tape were laminated to a Glass Microscope Slide and a hand-held rubber roller was used to apply pressure on the PET film side, to form a PET/PSA/Glass laminate. This laminate was then tested for luminous transmittance, haze, opacity and percentage wet-out. The data are listed in Table 3 as AL (after lamination to glass).

Example 2

Adhesive A was solvent cast on the liner with pattern P1, as described in Example 1, except to a dry coating thickness of 50 micrometers. Samples of this tape as well as laminates made to a Glass Microscope Slide were prepared and tested as described in Example 1. The data for before and after lamination to glass are listed in Table 3.

Example 3

Adhesive A was solvent cast on the liner with pattern P1, as described in Example 1, except to a dry coating thickness of 75 micrometers. Samples of this tape as well as laminates made to a Glass Microscope Slide were prepared and tested as described in Example 1. The data for before and after lamination to glass are listed in Table 3.

TABLE 3

| | Wet-out | Luminous Transmittance | Haze (%) | | Opacity (%) | |
|---|---|---|---|---|---|---|
| Example | (%) | (%) | C2° | A2° | C2° | A2° |
| 1 BL | — | 88.0 | 50.9 | 50.7 | 5.4 | 5.3 |
| 1 AL | 95.8 | 88.3 | 9.9 | 9.9 | 1.6 | 1.6 |
| 2 BL | — | 87.6 | 57.7 | 57.5 | 5.8 | 5.8 |
| 2 AL | 99.7 | 89.1 | 5.0 | 5.0 | 0.8 | 0.8 |
| 3 BL | — | 89.7 | 57.0 | 56.8 | 5.6 | 5.6 |
| 3 AL | 99.9 | 90.1 | 1.6 | 1.6 | 0.4 | 0.4 |

Example 4

Adhesive B was coated on the liner with pattern P1 with a knife coater, dried in a 65° C. oven for 15 minutes to yield a dry coating thickness of 75 micrometers. The exposed adhesive side of the PSA film was laminated at room temperature to a 50 micron PET. The lamination was made using a two roll nip to provide uniform PET/PSA/Liner laminates. The P1 liner was removed to form a tape with exposed microstructured PSA surface. Samples of this tape as well as laminates made to a Glass Microscope Slide were prepared and tested as described in Example 1. The data for before and after lamination to glass are listed in Table 4.

TABLE 4

| Example | Luminous Transmittance (%) | Haze (%) C2° | Haze (%) A2° | Opacity (%) C2° | Opacity (%) A2° |
|---|---|---|---|---|---|
| 4 BL | 89.6 | 63.8 | 63.5 | 7.2 | 7.2 |
| 4 AL | 89.8 | 1.8 | 1.8 | 0.6 | 0.6 |

Example 5

To Adhesive C was added 0.1 parts of IRGACURE 651 and the resulting mixture was coated onto the liner with pattern P1 with a knife coater at a thickness of 75 micrometers. The exposed adhesive side of the PSA film was laminated at room temperature to a 50 micron PET, and the composition was cured by exposure to low intensity UV light (GE Blacklight F40BL) for 3 minutes. The P1 liner was removed to form a tape with exposed microstructured PSA surface. Samples of this tape as well as laminates made to a Glass Microscope Slide were prepared and tested as described in Example 1. The data for before and after lamination to glass are listed in Table 5.

TABLE 5

| Example | Luminous Transmittance (%) | Haze (%) C2° | Haze (%) A2° | Opacity (%) C2° | Opacity (%) A2° |
|---|---|---|---|---|---|
| 5 BL | 89.6 | 80.9 | 80.7 | 6.9 | 6.9 |
| 5 AL | 90.1 | 1.6 | 1.5 | 0.8 | 0.8 |

Comparative Example C1

Adhesive A was cast on the patterned liner with pattern P7 with a knife coater, dried in a 65° C. oven for 15 minutes to yield a dry coating thickness of 25 micrometers. The exposed adhesive side of the PSA film was laminated at room temperature to a 50 micron PET. The lamination was made using a two roll nip to provide uniform PET/PSA/Liner laminates. The P7 liner was removed to form a tape with exposed microstructured PSA surface. Samples of this tape as well as laminates made to a Glass Microscope Slide were prepared and tested as described in Example 1. The data for before and after lamination to glass are listed in Table 6.

Comparative Example C2

Adhesive A was solvent cast on the liner with pattern P7, as described in Comparative Example C1, except to a dry coating thickness of 50 micrometers. Samples of this tape as well as laminates made to a Glass Microscope Slide were prepared and tested as described in Example 1. The data for before and after lamination to glass are listed in Table 6.

Comparative Example C3

Adhesive A was solvent cast on the liner with pattern P7, as described in Comparative Example C1, except to a dry coating thickness of 75 micrometers. Samples of this tape as well as laminates made to a Glass Microscope Slide were prepared and tested as described in Example 1. The data for before and after lamination to glass are listed in Table 6.

Comparative Example C4

Adhesive A was solvent cast on the liner with pattern P7, as described in Comparative Example C1, except to a dry coating thickness of 100 micrometers. Samples of this tape as well as laminates made to a Glass Microscope Slide were prepared and tested as described in Example 1. The data for before and after lamination to glass are listed in Table 6.

TABLE 6

| Example | Luminous Transmittance (%) | Haze (%) C2° | Haze (%) A2° | Opacity (%) C2° | Opacity (%) A2° |
|---|---|---|---|---|---|
| C1 BL | 90.0 | 46.5 | 46.4 | 3.9 | 3.9 |
| C1 AL | 87.4 | 13.1 | 13.1 | 1.2 | 1.2 |
| C2 BL | 90.1 | 40.1 | 40.1 | 3.9 | 3.9 |
| C2 AL | 88.8 | 7.7 | 7.7 | 0.8 | 0.8 |
| C3 BL | 89.8 | 39.3 | 39.2 | 3.9 | 3.9 |
| C3 AL | 89.0 | 4.9 | 4.9 | 0.8 | 0.8 |
| C4 BL | 89.6 | 38.3 | 39.2 | 3.6 | 3.6 |
| C4 AL | 89.2 | 3.2 | 3.2 | 0.7 | 0.6 |

Example 6

To Adhesive D was added 0.1 parts of IRGACURE 651 and the resulting mixture was coated onto the liner with pattern P2 with a knife coater at a thickness of 25 micrometers. The exposed adhesive side of the PSA film was laminated at room temperature to a 50 micron PET, and the composition was cured by exposure to low intensity UV light (GE Blacklight F40BL) for 3 minutes. The P2 liner was removed to form a tape with exposed microstructured PSA surface. Samples of this tape as well as laminates made to a Glass Microscope Slide (the tape was laminated to the glass slide following the direction of the grooves, i.e. the machine direction) were prepared and tested as described in Example 1. The data for before and after lamination to glass are listed in Table 7.

Example 7

To Adhesive D was added 0.1 parts of IRGACURE 651 and the resulting mixture was coated onto the liner with pattern P2 with a knife coater at a thickness of 50 micrometers. The exposed adhesive side of the PSA film was laminated at room temperature to a 50 micron PET, and the composition was cured by exposure to low intensity UV light (GE Blacklight F40BL) for 3 minutes. The P2 liner was removed to form a tape with exposed microstructured PSA surface. Samples of this tape as well as laminates made to a Glass Microscope Slide (the tape was laminated to the glass slide following the direction of the grooves, i.e. the machine direction) were prepared and tested as described in Example 1. The data for before and after lamination to glass are listed in Table 7.

Example 8

To Adhesive D was added 0.1 parts of IRGACURE 651 and the resulting mixture was coated onto the liner with pattern P2 with a knife coater at a thickness of 75 micrometers. The exposed adhesive side of the PSA film was laminated at room temperature to a 50 micron PET, and the composition was cured by exposure to low intensity UV light (GE Blacklight F40BL) for 3 minutes. The P2 liner was removed to form a tape with exposed microstructured PSA surface. Samples of this tape as well as laminates made to a Glass Microscope Slide (the tape was laminated to the glass slide following the direction of the grooves, i.e. the machine direction) were prepared and tested as described in Example 1. The data for before and after lamination to glass are listed in Table 7.

TABLE 7

| Example | Luminous Transmittance (%) | Haze (%) C2° | Haze (%) A2° | Opacity (%) C2° | Opacity (%) A2° |
| --- | --- | --- | --- | --- | --- |
| 6 BL | 90.0 | 41.3 | 41.1 | 5.4 | 5.4 |
| 6 AL | 89.4 | 7.6 | 7.5 | 1.6 | 1.5 |
| 7 BL | 90.0 | 40.2 | 40.1 | 4.9 | 4.8 |
| 7 AL | 90.0 | 3.0 | 2.9 | 0.8 | 0.8 |
| 8 BL | 90.2 | 39.7 | 39.5 | 5.6 | 5.6 |
| 8 AL | 90.0 | 1.5 | 1.5 | 0.4 | 0.4 |

Comparative Example C5

Comparative Example C5 was prepared identically to Example 6 except that the direction of lamination to the Glass Microscope Slide was perpendicular to the direction of the grooves i.e. the cross-direction. Samples of this laminate made to a Glass Microscope Slide were tested as described in Example 1. The data for after lamination to glass are listed in Table 8.

Comparative Example C6

Comparative Example C6 was prepared identically to Example 7 except that the direction of lamination to the Glass Microscope Slide was perpendicular to the direction of the grooves i.e. the cross-direction. Samples of this laminate made to a Glass Microscope Slide were tested as described in Example 1. The data for after lamination to glass are listed in Table 8.

Comparative Example C7

Comparative Example C7 was prepared identically to Example 8 except that the direction of lamination to the Glass Microscope Slide was perpendicular to the direction of the grooves i.e. the cross-direction. Samples of this laminate made to a Glass Microscope Slide were tested as described in Example 1. The data for after lamination to glass are listed in Table 8.

TABLE 8

| Example | Luminous Transmittance (%) | Haze (%) C2° | Haze (%) A2° | Opacity (%) C2° | Opacity (%) A2° |
| --- | --- | --- | --- | --- | --- |
| C5 AL | 87.8 | 19.4 | 19.4 | 3.0 | 3.0 |
| C6 AL | 88.8 | 16.4 | 16.3 | 1.8 | 1.8 |
| C7 AL | 89.2 | 15.7 | 15.6 | 1.7 | 1.6 |

Example 9

To Adhesive D was added 0.1 parts of IRGACURE 651 and the resulting mixture was coated onto the liner with pattern P5 with a knife coater at a thickness of 100 micrometers. The exposed adhesive side of the PSA film was laminated at room temperature to a 50 micron PET, and the composition was cured by exposure to low intensity UV light (GE Blacklight F40BL) for 3 minutes. The P5 liner was removed to form a tape with exposed microstructured PSA surface. A laminate to a Glass Microscope Slide was prepared and tested as described in Example 1 (the tape was laminated to the glass slide following the direction of the grooves, i.e. the machine direction). The data for after lamination to glass are listed in Table 9.

TABLE 9

| Example | Luminous Transmittance (%) | Haze (%) C2° | Haze (%) A2° | Opacity (%) C2° | Opacity (%) A2° |
| --- | --- | --- | --- | --- | --- |
| 9 AL | 89.9 | 1.5 | 1.5 | 0.5 | 0.6 |

Example 10

Adhesive B was coated on the liner with pattern P6 with a knife coater, dried in a 65° C. oven for 15 minutes to yield a dry coating thickness of 25 micrometers. The exposed adhesive side of the PSA film was laminated at room temperature to a 50 micron PET. The lamination was made using a two roll nip to provide uniform PET/PSA/Liner laminates. The P6 liner was removed to form a tape with exposed microstructured PSA surface. A laminate to a Glass Microscope Slide (the tape was laminated to the glass slide following the direction of the grooves, i.e. the machine direction) was prepared and tested as described in Example 1. The data for after lamination to glass are listed in Table 10.

Example 11

Adhesive B was coated on the liner with pattern P6, as described in Example 10, except to a dry coating thickness of 50 micrometers. Samples of this tape laminated to a Glass Microscope Slide were prepared and tested as described in Example 1 (the tape was laminated to the glass slide following the direction of the grooves, i.e. the machine direction). The data for after lamination to glass are listed in Table 10.

Example 12

Adhesive B was coated on the liner with pattern P6, as described in Example 10, except to a dry coating thickness of 75 micrometers. Samples of this tape laminated to a Glass Microscope Slide were prepared and tested as described in Example 1 (the tape was laminated to the glass slide following the direction of the grooves, i.e. the machine direction). The data for after lamination to glass are listed in Table 10.

TABLE 10

| Example | Luminous Transmittance (%) | Haze (%) C2° | Haze (%) A2° | Opacity (%) C2° | Opacity (%) A2° |
| --- | --- | --- | --- | --- | --- |
| 10 AL | 87.7 | 20.3 | 21.0 | 2.8 | 2.9 |
| 11 AL | 89.8 | 3.5 | 3.5 | 0.7 | 0.7 |
| 12 AL | 89.9 | 1.9 | 1.8 | 0.4 | 0.4 |

Example 13

To Adhesive E was added 0.1 parts of IRGACURE 651 and the resulting mixture was coated onto the liner with pattern P1 with a knife coater at a thickness of 125 micrometers. The exposed adhesive side of the PSA film was laminated at room temperature to another liner with pattern P1, and the composition was cured by exposure to low intensity UV light (GE Blacklight F40BL) for 3 minutes. The P1 liners were removed to form a transfer tape with exposed microstructured PSA surfaces on both sides. Samples of this tape as well as laminates made to a Glass Microscope Slide (glass/PSA laminate) and laminates made by laminating this glass/PSA laminate to another Glass Microscope Slide (glass/PSA/glass laminate) were prepared and tested as described in Example 1. The data for before (no lamination) and after lamination to one glass substrate (single lamination) as well as lamination to two glass substrates (double lamination) are listed in Table 11.

TABLE 11

| Example | Luminous Transmittance (%) | Haze (%) C2° | Haze (%) A2° | Opacity (%) C2° | Opacity (%) A2° |
|---|---|---|---|---|---|
| 13 NL | 92.2 | 100.0 | 99.7 | 7.1 | 7.1 |
| 13 SL | 92.2 | 57.3 | 57.2 | 4.3 | 4.3 |
| 13 DL | 92.1 | 1.3 | 1.3 | 0.4 | 0.4 |

Comparative Example C8

Adhesive A was cast on the patterned liner with pattern P8 with a knife coater, dried in a 65° C. oven for 15 minutes to yield a dry coating thickness of 12.5 micrometers. The exposed adhesive side of the PSA film was laminated at room temperature to a 50 micron PET. The lamination was made using a two roll nip to provide uniform PET/PSA/Liner laminates. The P8 liner was removed to form a tape with exposed microstructured PSA surface. Samples of this tape as well as laminates made to a Glass Microscope Slide were prepared and tested as described in Example 1. The data for before and after lamination to glass are listed in Table 12.

Comparative Example C9

Adhesive A was solvent cast on the liner with pattern P8, as described in Comparative Example C8, except to a dry coating thickness of 25 micrometers. Samples of this tape as well as laminates made to a Glass Microscope Slide were prepared and tested as described in Example 1. The data for before and after lamination to glass are listed in Table 12.

Comparative Example C10

Adhesive A was solvent cast on the liner with pattern P8, as described in Comparative Example C8, except to a dry coating thickness of 50 micrometers. Samples of this tape as well as laminates made to a Glass Microscope Slide were prepared and tested as described in Example 1. The data for before and after lamination to glass are listed in Table 12.

Comparative Example C11

Adhesive A was solvent cast on the liner with pattern P8, as described in Comparative Example C8, except to a dry coating thickness of 75 micrometers. Samples of this tape as well as laminates made to a Glass Microscope Slide were prepared and tested as described in Example 1. The data for before and after lamination to glass are listed in Table 12.

Comparative Example C12

Adhesive A was solvent cast on the liner with pattern P8, as described in Comparative Example C8, except to a dry coating thickness of 100 micrometers. Samples of this tape as well as laminates made to a Glass Microscope Slide were prepared and tested as described in Example 1. The data for after lamination to glass are listed in Table 12.

TABLE 12

| Example | Luminous Transmittance (%) | Haze (%) C2° | Haze (%) A2° | Opacity (%) C2° | Opacity (%) A2° |
|---|---|---|---|---|---|
| C8 BL | 83.3 | 94.1 | 83.3 | 9.1 | 9.1 |
| C8 AL | 72.6 | 18.5 | 18.6 | 8.2 | 8.2 |
| C9 BL | 83.8 | 83.7 | 82.8 | 8.4 | 8.3 |
| C9 AL | 77.2 | 17.3 | 17.8 | 6.2 | 6.1 |
| C10 BL | 84.3 | 83.4 | 82.9 | 8.7 | 8.7 |
| C10 AL | 80.5 | 19.7 | 19.8 | 3.8 | 3.8 |
| C11 BL | 85.2 | 83.4 | 82.9 | 8.6 | 8.5 |
| C11 AL | 77.9 | 23.2 | 24.9 | 5.7 | 5.7 |
| C12 AL | 86.9 | 7.1 | 7.0 | 1.5 | 1.5 |

Example 14

Adhesive A was solvent cast on the liner with pattern P4, as described in Example 1, except to a dry coating thickness of 25 micrometers. Samples of this tape as well as laminates made to a Glass Microscope Slide (the tape was laminated to the glass slide following the direction of the grooves, i.e. the machine direction) were prepared and tested as described in Example 1. The data for after lamination to glass are listed in Table 13.

Example 15

Adhesive A was solvent cast on the liner with pattern P4, as described in Example 1, except to a dry coating thickness of 50 micrometers. Samples of this tape as well as laminates made to a Glass Microscope Slide (the tape was laminated to the glass slide following the direction of the grooves, i.e. the machine direction) were prepared and tested as described in Example 1. The data for after lamination to glass are listed in Table 13.

Example 16

Adhesive A was solvent cast on the liner with pattern P4, as described in Example 1, except to a dry coating thickness of 75 micrometers. Samples of this tape as well as laminates made to a Glass Microscope Slide (the tape was laminated to the glass slide following the direction of the grooves, i.e. the machine direction) were prepared and tested as described in Example 1. The data for after lamination to glass are listed in Table 13.

TABLE 13

| Example | Luminous Transmittance (%) | Haze (%) C2° | Haze (%) A2° | Opacity (%) C2° | Opacity (%) A2° |
|---|---|---|---|---|---|
| 14 AL | 89.9 | 3.2 | 3.2 | 0.6 | 0.6 |
| 15 AL | 89.9 | 1.8 | 1.8 | 0.6 | 0.6 |
| 16 AL | 89.9 | 1.7 | 1.7 | 0.6 | 0.5 |

Example 17

Adhesive A was solvent cast on the liner with pattern P3, as described in Example 1, except to a dry coating thickness of 25 micrometers. Samples of this tape as well as laminates made to a Glass Microscope Slide (the tape was laminated to the glass slide following the direction of the grooves, i.e.

the machine direction) were prepared and tested as described in Example 1. The data for after lamination to glass are listed in Table 14.

Example 18

Adhesive A was solvent cast on the liner with pattern P3, as described in Example 1, except to a dry coating thickness of 50 micrometers. Samples of this tape as well as laminates made to a Glass Microscope Slide (the tape was laminated to the glass slide following the direction of the grooves, i.e. the machine direction) were prepared and tested as described in Example 1. The data for after lamination to glass are listed in Table 14.

Example 19

Adhesive A was solvent cast on the liner with pattern P3, as described in Example 1, except to a dry coating thickness of 75 micrometers. Samples of this tape as well as laminates made to a Glass Microscope Slide (the tape was laminated to the glass slide following the direction of the grooves, i.e. the machine direction) were prepared and tested as described in Example 1. The data for after lamination to glass are listed in Table 14.

TABLE 14

| Example | Luminous Transmittance (%) | Haze (%) C2° | Haze (%) A2° | Opacity (%) C2° | Opacity (%) A2° |
|---|---|---|---|---|---|
| 17 AL | 89.7 | 4.2 | 4.2 | 0.7 | 0.7 |
| 18 AL | 89.9 | 2.0 | 2.0 | 0.6 | 0.5 |
| 19 AL | 89.9 | 2.0 | 1.9 | 0.5 | 0.5 |

Comparative Example C13

Adhesive A was cast on the patterned liner with pattern P11 with a knife coater, dried in a 65° C. oven for 15 minutes to yield a dry coating thickness of 125 micrometers. The exposed adhesive side of the PSA film was laminated at room temperature to a 50 micron PET. The lamination was made using a two roll nip to provide uniform PET/PSA/Liner laminates. The P11 liner was removed to form a tape with exposed microstructured PSA surface. Samples of this tape as well as laminates made to a Glass Microscope Slide were prepared and tested as described in Example 1. The data for before and after lamination to glass are listed in Table 15.

TABLE 15

| Example | Luminous Transmittance (%) | Haze (%) C2° | Haze (%) A2° | Opacity (%) C2° | Opacity (%) A2° |
|---|---|---|---|---|---|
| C13 BL | 63.4 | 93.4 | 93.3 | 20.5 | 20.4 |
| C13 AL | 70.5 | 25.1 | 25.1 | 9.1 | 9.1 |

Comparative Example C14

To Adhesive C was added 0.1 parts of IRGACURE 651 and the resulting mixture was coated onto the liner with pattern P9 with a knife coater at a thickness of 75 micrometers. The exposed adhesive side of the PSA film was laminated at room temperature to a 50 micron PET, and the composition was cured by exposure to low intensity UV light (GE Blacklight F40BL) for 3 minutes. The P9 liner was removed to form a tape with exposed microstructured PSA surface. Samples of this tape as well as laminates made to a Glass Microscope Slide were prepared and tested as described in Example 1. The data for before and after lamination to glass are listed in Table 16.

TABLE 16

| Example | Luminous Transmittance (%) | Haze (%) C2° | Haze (%) A2° | Opacity (%) C2° | Opacity (%) A2° |
|---|---|---|---|---|---|
| C14 BL | 89.6 | 54.2 | 54.2 | 5.9 | 5.9 |
| C14 AL | 87.3 | 23.7 | 23.7 | 3.8 | 3.8 |

Comparative Example C15

To Adhesive C was added 0.1 parts of IRGACURE 651 and the resulting mixture was coated onto the liner with pattern P10 with a knife coater at a thickness of 125 micrometers. The exposed adhesive side of the PSA film was laminated at room temperature to a 50 micron PET, and the composition was cured by exposure to low intensity UV light (GE Blacklight F40BL) for 3 minutes. The P10 liner was removed to form a tape with exposed microstructured PSA surface. Samples of this tape as well as laminates made to a Glass Microscope Slide were prepared and tested as described in Example 1. The data for before and after lamination to glass are listed in Table 17.

TABLE 17

| Example | Luminous Transmittance (%) | Haze (%) C2° | Haze (%) A2° | Opacity (%) C2° | Opacity (%) A2° |
|---|---|---|---|---|---|
| C15 BL | 89.7 | 29.1 | 29.0 | 4.1 | 4.1 |
| C15 AL | 89.6 | 4.6 | 4.6 | 0.7 | 0.7 |

Example 20

Adhesive A was solvent cast on the liner with pattern P1 with a knife coater, dried in a 65° C. oven for 15 minutes to yield a dry coating thickness of 75 micrometers. The exposed adhesive side of the PSA film was laminated at room temperature to a Glass Microscope Slide. The lamination was made using a two roll nip to provide uniform Glass/PSA/Liner laminates. The P1 liner was removed to expose the microstructured PSA surface. Two of these microstructured PSA surfaces from 2 samples of this laminate glass construction were contacted such that the microstructure patterns were aligned either at 0° or 45° to each other, and carefully pressed together to form a Glass/PSA/PSA/Glass laminate. No pressure was applied to the laminate. The laminate was then placed in an 85° C. oven for 24 hours to form the final Glass/PSA/Glass laminate. This laminate was then tested for luminous transmittance, haze, and opacity. The data are listed in Table 18.

TABLE 18

| Example | Alignment Angle | Luminous Transmittance (%) | Haze (%) C2° | Haze (%) A2° | Opacity (%) C2° | Opacity (%) A2° |
|---|---|---|---|---|---|---|
| 20 | 0° | 90.3 | 1.4 | 1.4 | 0.6 | 0.5 |
| 20 | 45° | 90.5 | 1.1 | 1.1 | 0.4 | 0.4 |

Example 21

Adhesive A was solvent cast on the liner with pattern P1 with a knife coater, dried in a 65° C. oven for 15 minutes to yield a dry coating thickness of 75 micrometers. The exposed adhesive side of the PSA film was laminated at room temperature to a Glass Microscope Slide. The lamination was made using a two roll nip to provide uniform Glass/PSA/Liner laminates. The P1 liner was removed to expose the microstructured PSA surface. This microstructured PSA surface was contacted to another Glass/PSA construction prepared from Adhesive A and also 75 micrometers thick but without a microstructured PSA surface. The 2 Glass/PSA laminates were carefully pressed together to form a Glass/PSA/PSA/Glass laminate. No pressure was applied to the laminate. The laminate was then placed in an 85° C. oven for 24 hours to form the final Glass/PSA/Glass laminate. This laminate was then tested for luminous transmittance, haze, and opacity. The data are listed in Table 19.

TABLE 19

| Example | Luminous Transmittance (%) | Haze (%) C2° | Haze (%) A2° | Opacity (%) C2° | Opacity (%) A2° |
|---|---|---|---|---|---|
| 21 | 90.5 | 1.1 | 1.1 | 0.4 | 0.4 |

Example 22

Adhesive A was solvent cast on the liner with pattern P2 with a knife coater, dried in a 65° C. oven for 15 minutes to yield a dry coating thickness of 75 micrometers. The exposed adhesive side of the PSA film was laminated at room temperature to a Glass Microscope Slide. The lamination was made using a two roll nip to provide uniform Glass/PSA/Liner laminates. The P2 liner was removed to expose the microstructured PSA surface. Two of these microstructured PSA surfaces from 2 samples of this laminate glass construction were contacted such that the microstructure patterns were aligned along the direction of the grooves, and carefully pressed together to form a Glass/PSA/PSA/Glass laminate. No pressure was applied to the laminate. The laminate was then placed in an 85° C. oven for 24 hours to form the final Glass/PSA/Glass laminate. This laminate was then tested for luminous transmittance, haze, and opacity. The data are listed in Table 20.

TABLE 20

| Example | Luminous Transmittance (%) | Haze (%) C2° | Haze (%) A2° | Opacity (%) C2° | Opacity (%) A2° |
|---|---|---|---|---|---|
| 22 | 90.0 | 1.2 | 1.2 | 0.5 | 0.5 |

Example 23

To Adhesive D was added 0.1 parts of IRGACURE 651 and the resulting mixture was coated onto the liner with pattern P5 with a knife coater at a thickness of 100 micrometers. The exposed adhesive side of the PSA film was laminated at room temperature to a Glass Microscope Slide and the composition was cured by exposure to low intensity UV light (GE Blacklight F40BL) for 3 minutes. The lamination was made using a two roll nip to provide uniform Glass/PSA/Liner laminates. The P5 liner was removed to expose the microstructured PSA surface. Two of these microstructured PSA surfaces from 2 samples of this laminate glass construction were contacted such that the microstructure patterns were aligned with the grooves at 90° to each other, and carefully pressed together to form a Glass/PSA/PSA/Glass laminate. No pressure was applied to the laminate. The laminate was then placed in an 85° C. oven for 24 hours to form the final Glass/PSA/Glass laminate. This laminate was then tested for luminous transmittance, haze, and opacity. The data are listed in Table 21.

TABLE 21

| Example | Luminous Transmittance (%) | Haze (%) C2° | Haze (%) A2° | Opacity (%) C2° | Opacity (%) A2° |
|---|---|---|---|---|---|
| 23 | 90.3 | 1.2 | 1.2 | 0.5 | 0.5 |

Example 24

Adhesive D was solvent cast on the liner with pattern P12 with a knife coater to yield a dry coating thickness of 62.5 micrometers. The exposed adhesive side of the PSA film was laminated at room temperature to a 50 micron PET. The lamination was made using a two roll nip to provide uniform PET/PSA/Liner laminates. The P12 liner was removed to form a tape with exposed microstructured PSA surface. Samples of the tape were laminated to a Glass Microscope Slide and a hand-held rubber roller was used to apply pressure on the PET film side, to form a PET/PSA/Glass laminate. This laminate was then tested for peel after a 15 minute dwell time, and was haze free to the naked eye after 3 days. A control sample of the same adhesive laminate that did not use a microstructured liner was also prepared and tested. The data are listed in Table 22.

TABLE 22

| Sample | Peel 15 minute dwell (N/dm) | Peel 3 day dwell (N/dm) | Haze after 3 day dwell (%) |
|---|---|---|---|
| Control | 39.8 | 39.6 | 2.4 |
| Example 24 | 15.9 | 29.5 | 2.4 |

Example 25

Adhesive D was solvent cast on the liner with pattern P13 with a knife coater to yield a dry coating thickness of 62.5 micrometers. The exposed adhesive side of the PSA film was laminated at room temperature to a 50 micron PET. The lamination was made using a two roll nip to provide uniform PET/PSA/Liner laminates. The P13 liner was removed to form a tape with an exposed microstructured PSA surface. Samples of the tape were laminated to a Glass Microscope Slide and a hand-held rubber roller was used to apply pressure on the PET film side, to form a PET/PSA/Glass laminate. This laminate was then tested for peel after a 15 minute dwell time, and was haze free to the naked eye after 3 days. A control sample of the same adhesive laminate that did not use a microstructured liner was also prepared and tested. The data are listed in Table 23.

TABLE 23

| Sample | Peel 15 minute dwell (N/dm) | Peel 3 day dwell (N/dm) | Haze after 3 day dwell (%) |
|---|---|---|---|
| Control | 39.8 | 39.6 | 2.4 |
| Example 25 | 22.1 | Not Tested | Not Tested |

A number of embodiments of the invention have been described. Nevertheless, it will be understood that various modifications may be made without departing from the spirit and scope of the invention. Other embodiments are within the scope of the following claims.

What is claimed is:

1. A substantially continuous pressure sensitive adhesive layer with a structured surface that forms an array or pattern, wherein the adhesive layer is capable of being dry laminated to a substrate to form a laminate, said adhesive layer having a haze alter dry lamination, measured according to ASTM D 1003-95, of less than about 50% of the haze of the adhesive layer before dry lamination, and wherein the adhesive layer after dry lamination has a luminous transmittance of more than about 85%, a haze of less than about 25% and an opacity of less than about 3%.

2. The pressure sensitive adhesive layer of claim 1, wherein the adhesive layer after dry lamination has a haze of less than about 10% of the haze of the adhesive layer before dry lamination.

3. The pressure sensitive adhesive layer of claim 1, wherein the adhesive layer after dry lamination has a haze of less than about 3% of the haze of the adhesive layer before dry lamination.

4. The pressure sensitive adhesive layer of claim 1, wherein the adhesive layer includes a regular array of structures, and the structures define a volume of at least $1 \times 10^3$ $\mu m^3$ on any 500 $\mu m$ diameter circular area in a two-dimensional plane of the adhesive layer.

5. The pressure sensitive adhesive layer of claim 4, wherein the structures define a volume of about $1.0 \times 10^3$ $\mu m^3$ to about $1 \times 10^7$ $\mu m^3$ on any 500 $\mu m$ diameter circular area of the adhesive layer.

6. The pressure sensitive adhesive of claim 4, wherein the adhesive layer is removable from the substrate.

7. The pressure sensitive adhesive of claim 1, wherein the adhesive layer is capable of being dry laminated to the substrate at a wet out of at least 85% as measured by the Percent Wet Out Test.

8. The pressure sensitive adhesive of claim 4, wherein the structures are selected from the group consisting of V-grooves and pyramids.

9. The pressure sensitive adhesive of claim 4, wherein the structures are square pyramids.

10. The pressure sensitive adhesive of claim 9, wherein the pyramids are truncated.

11. The pressure sensitive adhesive of claim 9, wherein the pyramids have a sidewall angle of loss than about 20°.

12. A transfer tape comprising a carrier layer with a substantially continuous pressure sensitive adhesive layer thereon, wherein the pressure sensitive adhesive layer has a structured surface that forms an array or pattern, and wherein the adhesive layer is capable of being dry laminated to a substrate to form a laminate, said adhesive layer having a haze after lamination, measured according to ASTM D 1003-95, of less than about 50% of the haze of the adhesive layer before lamination, and wherein the adhesive layer after dry lamination has a luminous transmittance of more than about 85%, a haze of less than about 25%, and an opacity of less than about 3%.

13. The transfer tape of claim 12, wherein the carrier layer is a release liner.

14. A tape comprising a substrate with a first surface and a second surface, wherein at least one of the first and second surfaces of the substrate have applied thereon a substantially continuous structured pressure sensitive adhesive layer, wherein the tape is capable of being dry laminated to a substrate to form a laminate, said adhesive layer having a haze after lamination, measured according to ASTM D 1003-95, of loss than about 50% of the haze of the adhesive layer before lamination, and wherein the adhesive layer after dry lamination has a luminous transmittance of more than about 85%, a haze of less than about 25%, and an opacity of less than about 3%.

15. The tape of claim 14, wherein the adhesive layer has a luminous transmittance of at least about 95%, a haze of less than about 10%, and an opacity of less than about 1%.

16. The tape of claim 15, wherein the haze is less than about 2%.

17. The tape of claim 14, wherein the substrate is a polymeric film.

18. The tape of claim 14, wherein the substrate is substantially specular.

* * * * *

UNITED STATES PATENT AND TRADEMARK OFFICE
CERTIFICATE OF CORRECTION

PATENT NO. : 6,838,142 B2
DATED : January 4, 2005
INVENTOR(S) : Yang, Jie

It is certified that error appears in the above-identified patent and that said Letters Patent is hereby corrected as shown below:

Column 3,
Line 58, delete "article;" and insert -- article. --, therefor.
Line 67, delete "layer;" and insert -- layer. --, therefor Column 4,
Line 2, delete "FIG. 5;" and insert -- FIG. 5. --, therefor.

Column 5,
Line 60, delete "terepthalate" and insert -- terephthalate --, therefor.

Column 25,
Line 8, delete "alter" and insert -- after --, therefor.
Line 12, after "25%" insert -- , --.

Column 26,
Lines 4 and 26, delete "loss" and insert -- less --, therefor.

Signed and Sealed this

Twenty-fourth Day of May, 2005

JON W. DUDAS
*Director of the United States Patent and Trademark Office*